(12) United States Patent
Stothers et al.

(10) Patent No.: US 8,914,154 B2
(45) Date of Patent: Dec. 16, 2014

(54) ACTIVE TUNED VIBRATION ABSORBER

(75) Inventors: Ian McGregor Stothers, Norfolk (GB); Luca Benassi, Kempten (DE)

(73) Assignee: Ultra Electronics Limited, Greenford (GB)

( * ) Notice: Subject to any disclaimer, the term of this patent is extended or adjusted under 35 U.S.C. 154(b) by 937 days.

(21) Appl. No.: 12/530,114

(22) PCT Filed: Mar. 5, 2008

(86) PCT No.: PCT/GB2008/000737
§ 371 (c)(1),
(2), (4) Date: Jan. 27, 2010

(87) PCT Pub. No.: WO2008/107668
PCT Pub. Date: Sep. 12, 2008

(65) Prior Publication Data
US 2010/0131114 A1 May 27, 2010

(30) Foreign Application Priority Data
Mar. 5, 2007 (GB) .................................. 0704224.5

(51) Int. Cl.
G05B 15/00 (2006.01)
F16F 7/10 (2006.01)
F16F 15/00 (2006.01)

(52) U.S. Cl.
CPC ............. *F16F 15/002* (2013.01); *F16F 7/1011* (2013.01)
USPC ........................................................ 700/280

(58) Field of Classification Search
CPC .............................. F16F 7/1011; F16F 15/002
USPC ........................................................ 700/280
See application file for complete search history.

(56) References Cited

U.S. PATENT DOCUMENTS

| 5,332,061 A | | 7/1994 | Majeed et al. |
| 5,613,009 A | * | 3/1997 | Miyazaki et al. .......... 381/71.11 |
| 5,620,068 A | | 4/1997 | Garnjost et al. |
| 5,758,311 A | | 5/1998 | Tsuji et al. |
| 5,823,307 A | | 10/1998 | Schubert et al. |
| 5,920,173 A | | 7/1999 | Mercadal et al. |
| 6,059,274 A | * | 5/2000 | Owen et al. .................. 267/136 |

(Continued)

FOREIGN PATENT DOCUMENTS

EP 0 468 547 A2 1/1992
EP 0 872 662 A2 10/1998

(Continued)

*Primary Examiner* — Mohammad Ali
*Assistant Examiner* — Sivalingam Sivanesan
(74) *Attorney, Agent, or Firm* — Dickstein Shapiro LLP

(57) ABSTRACT

An active tuned vibration absorber (100) is disclosed for reducing vibrations in a structure, the vibration absorber comprising: a mount (104) for attachment to the structure; a moveable mass (106); a spring arrangement (108) connected between the mass and the mount; an actuator arrangement (110) for applying a force between the mass and the mount; a first sensor (112) for providing a first measurement indicative of a force exerted between the structure and the mount; a second sensor (114) for providing a second measurement indicative of an acceleration of the structure at or proximate to the mount; and a control system (116) for generating an actuator driving signal for driving the actuator using the first and second measurement, wherein the control system is operable to generate the actuator driving signal to cause the first measurement and second measurement to conform to a target relationship.

25 Claims, 15 Drawing Sheets

(56) References Cited

U.S. PATENT DOCUMENTS

| | | | |
|---|---|---|---|
| 6,816,800 B2 * | 11/2004 | Heiland | 702/109 |
| 7,222,704 B2 * | 5/2007 | Pearson et al. | 188/378 |
| 7,398,143 B2 * | 7/2008 | Stothers et al. | 701/37 |
| 7,992,794 B2 * | 8/2011 | Leen et al. | 236/51 |
| 2002/0099487 A1 * | 7/2002 | Suganuma et al. | 701/48 |
| 2005/0116110 A1 * | 6/2005 | Mitzmacher | 244/137.4 |
| 2007/0028885 A1 * | 2/2007 | Stothers et al. | 123/192.1 |

FOREIGN PATENT DOCUMENTS

| | | | | |
|---|---|---|---|---|
| EP | 872662 A2 | * | 10/1998 | F16M 13/00 |
| GB | 2 404 716 A | | 2/2005 | |
| GB | 2404716 A | * | 2/2005 | F16F 15/02 |
| GB | 2 406 369 A | | 3/2005 | |
| GB | 2406369 A | * | 3/2005 | B60G 17/018 |
| GB | 2447231 A | * | 9/2008 | G01M 1/38 |
| WO | WO 2005/031186 A2 | | 4/2005 | |

* cited by examiner

FRONT VIEW

TOP VIEW

ACTIVE TUNED VIBRATION ABSORBER

The present invention relates to an active tuned vibration absorber, a control system for an active tuned vibration absorber, and a method of controlling an active tuned vibration absorber.

Tuned vibration absorbers are devices that can be attached to a structure (including a fixed structure, such as a bridge, or a moveable structure, such as an aircraft) in order to reduce vibrations in the structure. Tuned vibration absorbers can be divided into two types: passive tuned vibration absorbers and active tuned vibration absorbers.

Passive tuned vibration absorbers include a moveable mass, some form of spring and (optionally) a damping element that together form a resonant mechanical system. The vibration absorbers are tuned, by appropriate choice of components, so that they resonate within a predetermined range of frequencies of vibration corresponding (for example) to an expected range of frequencies of vibration in the structure. When the vibration absorber responds strongly to a vibration in the structure, energy is transferred to the vibration absorber and is then dissipated within the vibration absorber. As a consequence, the vibrations in the structure may be reduced.

The Q factor of a resonant system is a measure of the amount of damping in the system (or, equivalently, it is a measure of the 'quality' of resonance). The Q factor is defined in various ways for different types of resonant systems. For example, for a mechanical system the Q factor can be determined by the formula $Q=\sqrt{(MK)}/R$, where M is the moveable mass of the absorber, K is the spring stiffness, and R is the mechanical resistance (damping), defined as $F_{damping}=-R.u$ (where u=the velocity of the mass, and $F_{damping}$=the force exerted by the damping element on the mass in the direction of the velocity).

More broadly, the mechanical impedance Z of a system at a given angular frequency $\omega$ can be defined (using complex variables) as $Z(j\omega)=f(j\omega)/u(j\omega)$ where $f(j\omega)$ is the complex amplitude of the force applied to the system at a frequency $\omega$ and $u(j\omega)$ is the complex amplitude of the resulting velocity in the direction of the force.

A system with a low Q factor has a relatively small response when driven at its resonant frequency by an external input (in this case, vibrations from the structure to which the vibration absorber is attached) but it also responds over a relatively large range of frequencies. In addition, a system with a low Q factor (high damping) reaches a steady state relatively quickly after a perturbation to the system (such as a change to the amplitude or frequency of external stimulation, for example). By contrast, a system with a high Q factor has a very strong response at its resonant frequency, but the system's response falls off quickly at frequencies moving away from the resonant frequency. A system with a high Q factor also takes longer to settle into a steady state when it is perturbed (it can experience 'ringing', with the system response oscillating for many cycles until reaching a steady state again).

Increasing the Q factor of a vibration absorber increases the response to vibrations, and can allow a smaller mass to be used without reducing the energy absorption at the resonant frequency. This is a significant consideration on structures such as aircraft, for example, where minimising mass is important. However, increasing the Q factor also increases the selectivity of the vibration response, and requires the vibration absorber to be more precisely tuned to the source of vibration. It can also be expensive and technically difficult to achieve very high Q factors (very low internal damping) in passive tuned vibration absorbers.

For some applications, such as noise reduction on aircraft, passive tuned vibration absorbers are generally not suitable. This is because the weight considerations require a vibration absorber to be provided with a high Q factor, and the expected range of frequency of vibrations in the structure exceeds the necessarily narrow bandwidth of response (because of the high Q factor, as noted above). The frequencies of vibration in the structure can also vary with time, and the properties of the passive vibration absorbers can also change over time because of the degradation of components and changes to environmental conditions.

Active tuned vibration absorbers are better suited to such applications. Active tuned vibration absorbers include all of the elements of a passive tuned vibration absorber, but also include an actuator for applying a force between the moveable mass and the structure and a control system for controlling the actuator. The actuator is driven either to impart energy to the mechanical system or to remove it from the system. A typical active tuned vibration absorber detects vibrations affecting the structure using sensors positioned in or adjacent to the vibration absorber, and uses a feedback loop to drive the actuator so as to counteract the detected vibrations. Adaptive filtering can be used to retune the vibration absorber, for example to track changes to the major frequencies of vibration in the structure (such changes arising, for example, due to changes in propeller or turbine speed). The aim of the control system of an active tuned vibration absorber is normally to reduce the detected vibrations to as close to zero as possible.

Such an active tuned vibration absorber suffers some drawbacks, however. A control scheme such as that described above can cause instability, with the control system inadvertently transferring mechanical energy to the structure via the actuator and thus causing the vibrations to increase in the structure (potentially catastrophically). The design of a vibration reduction system can also be difficult if more than one active tuned vibration absorber is envisaged, since vibrations induced by one vibration absorber can influence the behaviour of another, and careful modelling and analysis can be required to ensure the stability of the system.

A first aspect of the present invention provides an active tuned vibration absorber for reducing vibrations in a structure, the vibration absorber comprising: a mount for attachment to the structure; a moveable mass; a spring arrangement connected between the mass and the mount; an actuator arrangement for applying a force between the mass and the mount; a first sensor for providing a first measurement indicative of a force exerted between the structure and the mount; a second sensor for providing a second measurement indicative of an acceleration of the structure at or proximate to the mount; and a control system for generating an actuator driving signal for driving the actuator using the first and second measurement, wherein the control system is operable to generate the actuator driving signal to cause the first measurement and second measurement to conform to a target relationship.

Thus, instead of attempting to cause a measured displacement, velocity or acceleration of the structure to converge to zero, the vibration absorber control system instead attempts to cause (a) the force applied between the structure and vibration absorber and (b) the acceleration of the structure, to conform to a target relationship. This control system can provide a reasonably efficient attenuation of vibrations with improved stability. In addition, the vibration absorber is controlled in dependence on essentially local measurements, so no prior knowledge of the structure to which the vibration absorber is to be attached is required. Furthermore, when a plurality of vibration absorbers are attached to a structure, the present invention can help to decouple the vibration absorbers from one another.

The control system may in particular be operable to generate the actuator driving signal to cause a frequency domain representation of the first measurement and a frequency domain representation of the second measurement to converge to a target ratio. In a similar aspect, the control system may be operable to generate a drive signal to cause the mechanical impedance of the vibration absorber to converge to a target mechanical impedance substantially equivalent to the mechanical impedance of a passive tuned device. Since passive devices are entirely dissipative devices (in a steady-state, they do not add energy to the structure to which they are attached), local and global stability can be improved. For example, additional vibration absorbers can be added to a structure without making the system as a whole unstable. It is not necessary for the target mechanical impedance to be dissipative at all frequencies, however. For example, in frequency ranges where there is little vibration and little response from the absorber, it may be acceptable to allow some energy flow from the absorber to the structure with little impact on the overall system behaviour.

In one embodiment, when in isolation from the actuator arrangement and control system, the moveable mass and the spring arrangement form a first resonant system having a first Q factor and, when controlled by and combined with the actuator arrangement and control system, the moveable mass and the spring arrangement form a second resonant system with a second Q factor, where the second Q factor is larger than the first Q factor. Furthermore the resonant frequency of the second resonant system may be different to the resonant frequency of the first resonant system. Providing an increased Q factor by means of the second resonant system can increase the effectiveness of the vibration absorber and avoid the need to provide relatively low levels of damping in the components of the vibration absorber (which can be expensive).

The control system may include a feedforward control system. This can allow the system to respond more quickly to changes in vibrations of the structure, make the design of the control system easier, and reduce the risk of instability. The control system may additionally or alternatively include a feedback control system. In conjunction with the feedforward control system the feedback control system can reduce the apparent Q factor of the vibration absorber from the viewpoint of the feedforward control system. This can improve robustness of the feedforward control system and the transient behaviour of the overall system and reduce the sensitivity to errors in the estimation of parameters of the vibration absorber. The feedforward control system may furthermore be operable to process signals using a reference model that is defined in terms of characteristics of the vibration absorber, whereby the reference model does not need to take into account characteristics of the structure. This can simplify the design of a vibration attenuation system.

The first sensor may be a force sensor (such as a force gauge) attached to or proximate the mount. The force sensor may measure the total or partial force applied between the moveable mass and the mount. The force sensor may be attached to the spring arrangement, for example. Alternatively, the first sensor may be an accelerometer attached to the moveable mass. An estimation of the total force applied between the structure and the vibration absorber can be determined from the force sensor or accelerometer measurement, for example by filtering the force or accelerometer measurement with a simple filter that may in practice just be a constant gain. Accelerometers are normally relatively inexpensive, but the force gauge was found to be more convenient because it could be fixed in place (rather than attached to a highly mobile object, namely the moveable mass).

The second sensor may be an accelerometer attached to or proximate the mount. Because the mount is attachable to the structure, an estimate of the acceleration of the structure can be determined from the accelerometer measurement, for example by multiplying the accelerometer measurement by a constant, or by filtering with a simple filter.

In one embodiment the vibration absorber further comprises a communications unit (which may be integral to the control system or otherwise) for communicating with a remote controller. The vibration absorber may be operable to receive a command signal (or succession of command signals) from the remote controller, and to alter the target relationship in dependence on the command signal. In an alternative embodiment, the vibration absorber is operable to receive a command signal (or succession of command signals) from the remote controller, and to drive the actuator (directly) using the command signal. Both modes of operation may be combined if desired.

The vibration absorber may also be operable to determine a communications failure between the vibration absorber and the remote controller, and to adapt to a local control mode in response to the communications failure. This can improve the safety of the structure should a failure occur. The vibration absorber may be operable to transmit at least one of the first and second measurements to the remote controller. This can provide a remote monitoring system using existing vibration absorbers.

The vibration absorber may be operable to receive a signal indicative of a characteristic frequency of vibration in the structure, and to alter the target relationship in dependence on the received signal. Alternatively or additionally, the vibration absorber may be operable to determine a characteristic frequency of vibration in the structure, and to alter the target relationship in dependence on the determined frequency.

The vibration absorber may be operable to process the first or second measurements to determine the frequency of a harmonic (such as the $2^{nd}$, $3^{rd}$, $4^{th}$, and so on) of a frequency of vibration (such as a dominant, secondary or other frequency), and to alter the target relationship in dependence on the determined harmonic frequency in order to counteract the vibration. A target frequency of vibration to counteract may be determined by dividing the determined frequency by the harmonic number, for example.

In an embodiment where the vibration absorber is to be used with a vibration source (such as a turboprop engine) that generates vibrations having a frequency varying over time within a set of characteristic frequencies, the control system further comprises: a plurality of control subsystems taking the first and second measurements as an input, each control subsystem being tuned to a respective one of the set of characteristic frequencies; and a processing unit for combining the output of the subsystems to generate the actuator driving signal. Thus, each control subsystem is configured to enforce a different target relationship corresponding to a respective frequency of vibration. The system can then adapt to changing frequencies of vibration without having to alter or recalculate any target relationships.

Each control subsystem may include an adaptive filter for generating the output of the subsystem, and the control system may be operable to control the adaptation of each of the adaptive filters in dependence on the degree of excitation or response of each of the subsystems (which may be computed as the short average term power of the output of each control subsystem, for example, or otherwise). Thus the control system can be operated to cease adaptation of filters in (and/or to gradually attenuate the output of) control subsystems that are not responding strongly to their inputs, which can increase the stability of the system.

In another aspect of the invention there is provided an active tuned vibration absorber for reducing vibrations in a structure, the vibration absorber comprising: a mount for attachment to the structure; a moveable mass; a spring arrangement connected between the mass and the mount; an actuator arrangement for applying a force between the mass and the mount; a feedforward control system for generating an actuator driving signal for driving the actuator, the actuator driving signal being generated to cause the mechanical impedance of the vibration absorber to converge to a target mechanical impedance substantially equivalent to the mechanical impedance of a passive tuned device. As mentioned above, the use of a feedforward control system can reduce the risk of instability. It will be appreciated that features associated with other aspects of the invention may also (where applicable) be combined with this aspect, and vice versa.

In a further aspect of the invention, there is provided an active tuned vibration absorber for reducing vibrations in a structure, the vibration absorber comprising: a mount for attachment to the structure; a moveable mass; a spring arrangement connected between the mass and the mount; an actuator arrangement for applying a force between the mass and the mount; a force sensor attached to or proximate the mount for outputting a measurement indicative of a force exerted between the structure and the mount; a control system for generating a drive signal for the actuator arrangement using the measurement, the actuator drive signal being generated to cause the mechanical impedance of the vibration absorber to converge to a target mechanical impedance substantially equivalent to the mechanical impedance of a passive tuned device. As mentioned above, the provision of a force sensor (such as a force gauge) attached to or proximate the mount can simplify the construction of the vibration absorber, and can allow effective operation even when the force sensor is arranged so as to measure only part of the force applied between the vibration absorber and the structure. It will be appreciated that features associated with the other aspects of the invention may also (where applicable) be combined with this aspect, and vice versa.

In a yet further aspect of the invention there is provided a system for attenuating vibrations in a structure, comprising a plurality of active tuned vibration absorbers as aforesaid. The system may further comprise a central controller, operable to receive at least one signal representative of a vibration in the structure, and to transmit a command signal to at least one of the plurality of vibration absorbers to control the or each vibration absorber to alter its behaviour in order to reduce the vibration.

In another aspect of the invention there is provided a control system for operating an active tuned vibration absorber, the vibration absorber being attachable to a structure and including an actuator arrangement, and the control system comprising: an input stage for inputting a first signal indicative of an acceleration of the structure at or proximate to the vibration absorber and a second signal indicative of a force exerted between the structure and the vibration absorber; an adaptive filter for outputting a control signal for driving the actuator arrangement, the adaptive filter having an input derived from the first signal; a first processing unit for processing the first signal in accordance with a target function to generate a desired force signal representing a desired force to be applied to the vibration absorber by the structure, the target function substantially representing a target relationship between the acceleration of the structure at or proximate to the vibration absorber and the force exerted between the structure and the vibration absorber; a second processing unit for processing the desired force signal and the second signal to generate an error force signal representing a difference between the desired force and an estimated force applied to the vibration absorber by the structure; and a third processing unit for adapting the adaptive filter to minimise the error force signal.

As before, the control system may be operable to generate the actuator driving signal to cause a frequency domain representation of the first measurement and a frequency domain representation of the second measurement to converge to a target ratio, and may also be operable to generate an actuator drive signal to cause the mechanical impedance of the vibration absorber to converge to a target mechanical impedance substantially equivalent to the mechanical impedance of a passive tuned device.

In one embodiment the adaptive filter is driven from the output of the first processing unit.

In a further aspect of the invention there is provided a vibration absorber including a control system as aforesaid.

In another aspect of the invention there is provided an active tuned vibration absorber for reducing vibrations in a structure, the structure being perturbed by a vibration source that generates vibrations having a frequency varying over time within a set of characteristic frequencies, and the vibration absorber comprising: a mount for attachment to the structure; a moveable mass; a spring arrangement connected between the mass and the mount; at least one sensor providing a measurement of a perturbation associated with the vibration source; an actuator arrangement for applying a force between the mass and the mount; and a control system for generating an actuator driving signal for driving the actuator using the or each measurement, comprising: a plurality of control subsystems taking the or each measurement as an input, each control subsystem being tuned to a respective one of the set of characteristic frequencies; and a processing unit for combining the output of the subsystems to generate the actuator driving signal. Again, features associated with other aspects of the invention may also (where applicable) be combined with this aspect, and vice versa.

In another aspect of the invention there is provided a method of controlling an active tuned vibration absorber attached to a structure, the method comprising: receiving a first signal indicative of an acceleration of the structure at or proximate to the vibration absorber; receiving a second signal indicative of a force exerted between the structure and the vibration absorber; generating an actuator driving signal using the first and second measurement for driving an actuator attached to a moveable mass, wherein the step of generating the actuator driving signal comprises generating the actuator driving signal to cause the first measurement and second measurement to conform to a target relationship.

In a further aspect of the invention there is provided a method of reducing vibrations in a structure, comprising: providing a mount for attachment to the structure; providing a moveable mass; providing a spring arrangement connected between the mass and the mount; providing an actuator arrangement for applying a force between the mass and the mount; providing a first sensor for providing a first measurement indicative of a force exerted between the structure and the mount; providing a second sensor for providing a second measurement indicative of an acceleration of the structure at or proximate to the mount; and providing a control system for generating an actuator driving signal for driving the actuator using the first and second measurement, wherein the control system is operable to generate the actuator driving signal to cause the first measurement and second measurement to conform to a target relationship.

In a yet further aspect of the invention there is provided a method of controlling an active tuned vibration absorber, the vibration absorber being attachable to a structure and including an actuator arrangement, and the method comprising: inputting a first signal indicative of an acceleration of the structure at or proximate to the vibration absorber and a second signal indicative of a force exerted between the structure and the vibration absorber; outputting a control signal for driving the actuator arrangement, the adaptive filter having an input derived from the first signal; processing the first signal in accordance with a target function to generate a desired force signal representing a desired force to be applied to the vibration absorber by the structure, the target function representing a target relationship between the acceleration of the structure at or proximate to the vibration absorber and the force exerted between the structure and the vibration absorber; processing the desired force signal and the second signal to generate an error force signal representing a difference between the desired force and an estimated force applied to the vibration absorber by the structure; and adapting the adaptive filter to minimise the error force signal.

The invention also provides a vibration absorber and/or control system and a method substantially as herein described with reference to FIGS. 1 to 17B.

The present invention can be implemented in any convenient form, for example using dedicated hardware, or a mixture of dedicated hardware and software.

Although each aspect and various features of the present invention have been defined hereinabove independently, it will be appreciated that, where appropriate, each aspect can be used in any combination with any other aspect(s) or features of the invention. In particular, features disclosed in relation to apparatus aspects may be provided in appropriate form in relation to method aspects, and vice versa.

Embodiments of the present invention will now be described with reference to the accompanying drawings, in which.

The structure and overall effect of the active tuned vibration absorber will be described. Some alternative embodiments will briefly be described, and the control system of the active tuned vibration absorber will then be described in more detail. Some adaptations of the control system, a typical device incorporating the active tuned vibration absorber, and some refinements of the active tuned vibration absorber will then be discussed.

Figure 1:
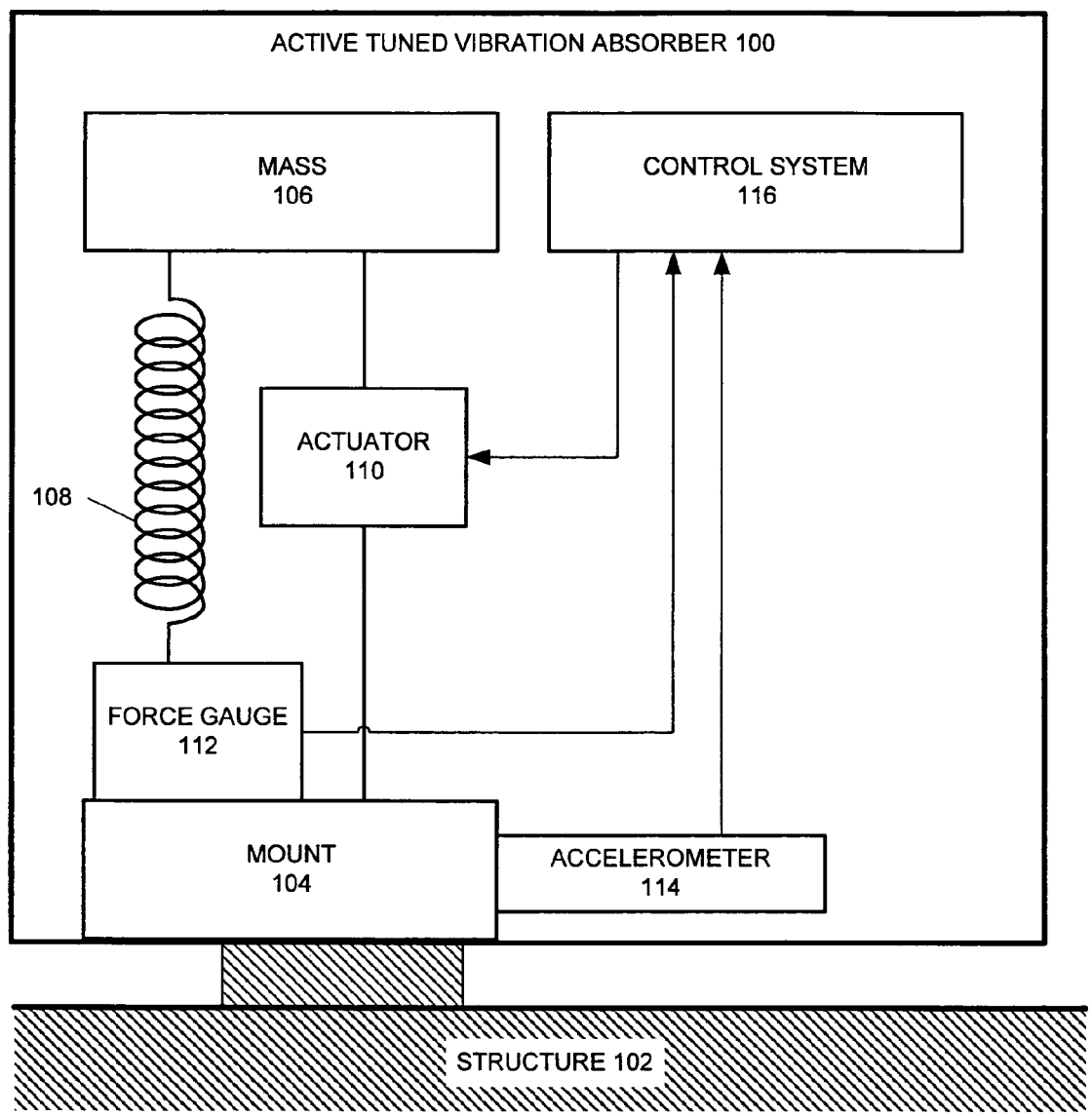
FIG. 1 is a schematic diagram of an active tuned vibration absorber according to an embodiment of the invention.

FIG. 1 is a schematic diagram of an active tuned vibration absorber according to a first embodiment of the invention.

The active tuned vibration absorber 100 is shown attached to a structure 102, which may be a fixed structure such as a building or a mobile structure such as an aircraft fuselage. The vibration absorber 100 includes a mount 104 for rigid attachment to the structure, a moveable mass 106, a spring 108, a low-impedance actuator 110, a force gauge 112, and accelerometer 114 and a control system 116.

It will be appreciated that FIG. 1 shows the elements of the vibration absorber in an essentially conceptual form. The spring 108 may be any suitably elastic material or device, such as a compressed air device, elastomer material, coiled metal spring, magnetic assembly and the like, and may have a form quite different to that shown in FIG. 1 (and other figures), for example. The mass 106 may in fact be formed from parts of the spring 108 and/or actuator 110. For example, the actuator 110 may comprise a wire coil wound around a permanent magnet (so that when the coil is energised, a force is actuated on the permanent magnet). In this example the permanent magnet may serve the purpose of the mass 106 as well as forming part of the actuator 110. Other variations of construction are of course possible, and further examples are given later on.

The constructional details of the mount 104 can also be varied, provided that the force gauge 112 and accelerometer 114 are disposed in rigid contact with the structure (so that vibrations and accelerations of the structure 102 in the vicinity of the vibration absorber 100 are transmitted substantially directly to the force gauge 112 and accelerometer 114). Any suitable devices can be used to implement the force gauge 112 and accelerometer 114.

The force gauge 112 and accelerometer 114 output electronic signals which are fed into the control system 116. The control system 116 processes the signals and generates an actuator driving signal, which is transmitted to the actuator 110.

The vibration absorber is also supplied with power and may be connected to a communications bus (depending on the application), as will be described later. The actuator 110 and control system 116 may be powered separately, or the actuator 110 may be powered via the actuator driving signal outputted by the control system 116, for example. The force gauge 112 and/or accelerometer 114 may also be powered or may be purely passive devices, depending on the type of devices that are used for those purposes.

The spring 108 has some degree of internal damping (being a real device) but, as is explained later, a separate damping component may be provided, and the mass 106, spring 108 and/or damping component may actually comprise a plurality of separate components arranged in any suitable series or parallel arrangement.

Figure 2:
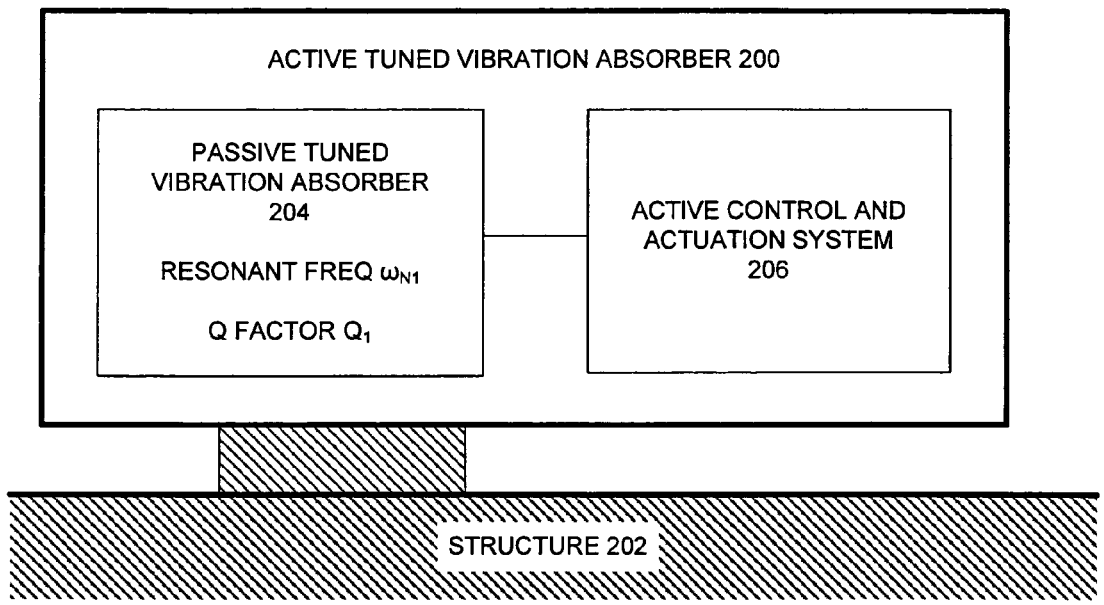
FIG. 2 is an alternative illustration of the active tuned vibration absorber of FIG. 1.

FIG. 2 is an alternative illustration of the active tuned vibration absorber of FIG. 1. The active tuned vibration absorber 200 and structure 202 are again shown.

The moveable mass and spring of FIG. 1 can be considered to constitute a passive tuned vibration absorber 204 in its own right. The moveable mass and spring of a passive tuned vibration absorber form a mechanical resonant system having a characteristic resonant frequency $\omega_{N1}$ and a characteristic Q factor $Q_1$. The addition of the actuator and control system 206 transforms the passive components 204 an active tuned vibration absorber 200.

As is explained in more detail below, the control system uses an adaptive feedforward control loop to attempt to cause the mechanical impedance of the system to converge to a target mechanical impedance (in contrast, for example, to a control law that attempted to cause the measured displacement, velocity or acceleration of the structure to converge to zero). Furthermore, in order to improve stability, a target mechanical impedance is chosen substantially corresponding to a passive (that is, energy dissipative) device, as described below.

The controller attempts to maintain the following relationship between an estimate of the force exerted by the structure on the vibration absorber ($f_a$) from the force gauge 112 of FIG. 1, and measurements of the acceleration of the structure in the vicinity of the vibration absorber ($\dot{u}_a$, in the same direction as $f_a$) from the accelerometer 114 of FIG. 1. Variables are considered to be functions of frequency here.

$$\frac{f_a}{\dot{u}_a} = T,$$

where $j\omega T$ represents the target mechanical impedance (defining a relationship between the force on, and velocity of, the structure in the vicinity of the vibration absorber). For example, the mechanical impedance of a passive tuned vibration absorber in the vicinity of its natural resonance frequency is given approximately by the following formula:

$$Z = \frac{j\omega M_{mc}\left(1 + \frac{j\omega}{\omega_n Q}\right)}{1 + \frac{j\omega}{\omega_n Q} - \frac{\omega^2}{\omega_n^2}}$$

Where $M_{mc}$ is the mass of the moveable mass 106 (with reference to FIG. 1).

Thus a T function may be chosen having the following corresponding formula:

$$j\omega T = \frac{j\omega M_{mc}\left(1 + \frac{j\omega}{\omega_t Q_t}\right)}{1 + \frac{j\omega}{\omega_t Q_t} - \frac{\omega^2}{\omega_t^2}}$$

Where $\omega_t$ and $Q_t$ represent a nominal resonant frequency and Q factor that can be selected as appropriate, either statically (determined at design time) or dynamically (adapting to variations in frequency when the device is operating), for example.

Figure 3:
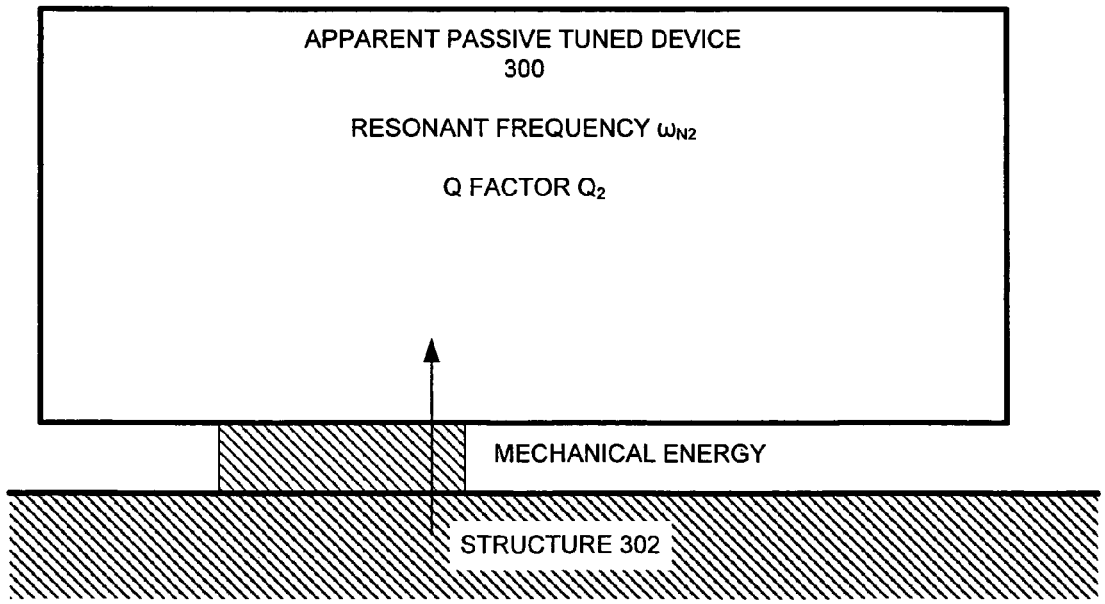
FIG. 3 is an illustration of the operation of the active tuned vibration absorber in a steady-state under the control of the actuation and control system of FIG. 2.

FIG. 3 illustrates the operation of the active tuned vibration absorber under the control of the actuation and control system of FIG. 2 using the target function defined above. As explained above, the effect of the actuator and control system operating using the control scheme described above is to make the active tuned vibration absorber behave approximately as if it were an equivalent passive tuned vibration absorber 300 with a characteristic resonant frequency $\omega_{N2}$ (approximately $\omega_t$) and a characteristic Q factor $Q_2$ (approximately $Q_t$).

Both the resonant frequency and the Q factor of the system can be adjusted by varying the target impedance T used by the control system. Thus the target impedance T can be altered to allow the resonant frequency $\omega_{N2}$ to track changes in the frequency of the main source of vibration, and also to allow the Q factor $Q_2$ to be made larger than the original Q factor $Q_1$, to increase the magnitude of the response at the resonant frequency, thereby achieving a greater effectiveness of vibration reduction.

The control system will be described in more detail below.

Figure 4:
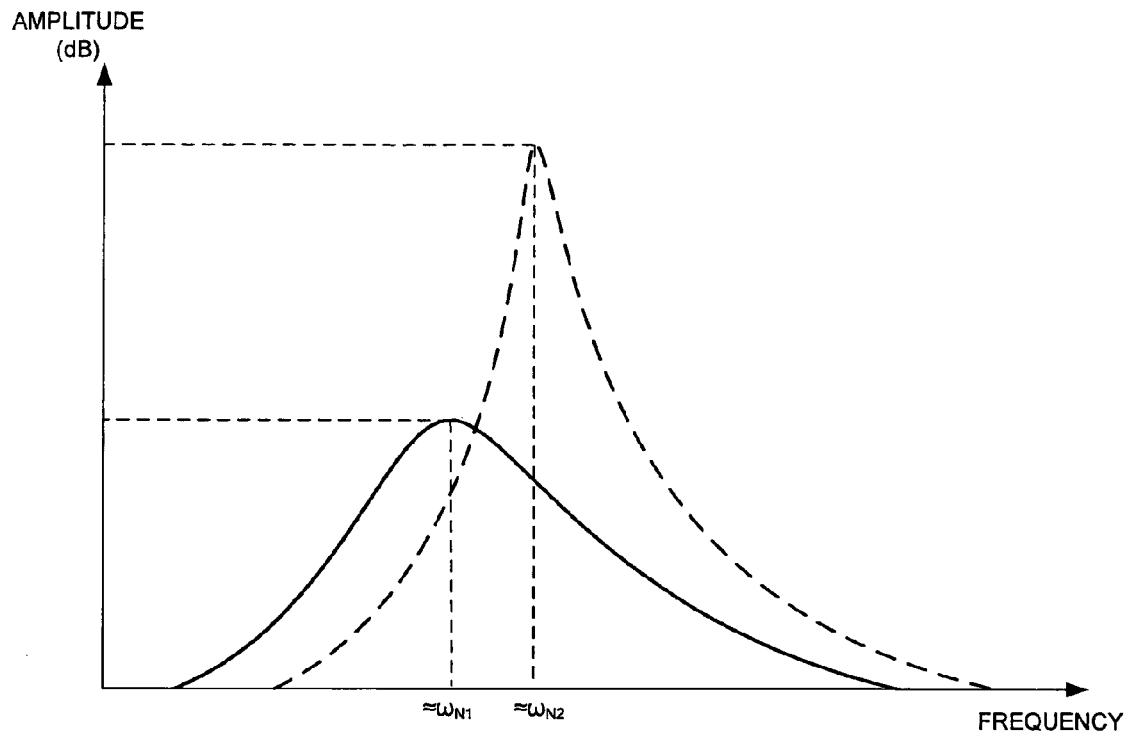
FIG. 4 is a graph further illustrating the operation of the active tuned vibration absorber under the control of the actuation and control system of FIG. 2.

FIG. 4 is a graph further illustrating the operation of the active tuned vibration absorber under the control of the actuation and control system of FIG. 2 and target function as defined above.

The solid line on the graph represents very approximately the magnitude of the impedance of the passive tuned vibration absorber 204 of FIG. 2 and the thick dashed line represents the magnitude of the impedance of the apparent passive tuned vibration absorber 300 of FIG. 3 (that is, the passive vibration absorber 204 of FIG. 2 under the control of the actuation and control system 206 of FIG. 2). It can be seen in this example that the effect of altering the natural resonant frequency $\omega_N$ is to shift the peak amplitude of response to a higher frequency, and that the effect of altering the Q factor Q is to make the peak more pronounced but also narrower.

Figure 5:
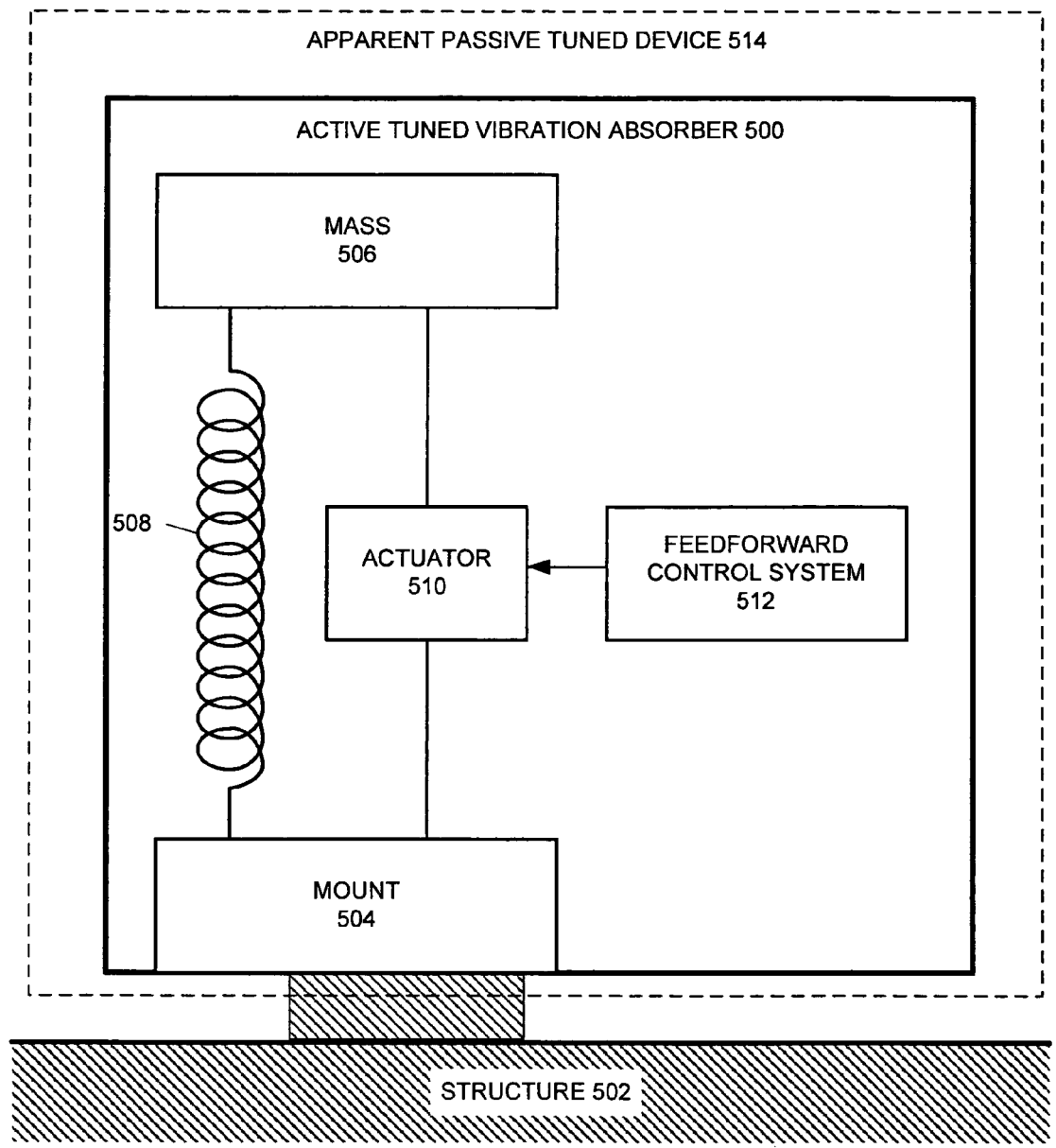
FIG. 5 is a schematic diagram of an alternative embodiment of the active tuned vibration absorber of FIG. 1.

FIG. 5 is a schematic diagram of an alternative embodiment of the active tuned vibration absorber of FIG. 1.

In this embodiment an active tuned vibration absorber 500 is shown attached to a structure 502 via the mount 504. A moveable mass 506 is attached to the mount 504 via a spring 508 and also via an actuator 510. The actuator is controlled by a feedforward control system 512 as described above in order to make the vibration absorber 500 appear to be substantially a passive device 514 (from the structure's perspective).

The feedforward control system 512 operates in the same way as the control system described above with reference to FIGS. 1 to 4, by attempting to cause the mechanical impedance of the system to converge to a target mechanical impedance corresponding to a passive tuned device. An appropriate choice of target function T is made, based on the operating characteristics of the structure and vibration absorber (as described in more detail later).

An appropriate input signal is provided to the feedforward control system 512 to allow it to measure or to infer the mechanical impedance of the vibration absorber. This may be by way of a force gauge measurement and an accelerometer measurement as in the previous embodiment, but may be by way of a velocimeter or displacement sensor, and an accelerometer mounted on the moveable mass 506, for example. Such an accelerometer reading can be related to the force exerted between the structure and the vibration absorber by the relationship $f_a = M_{mc}\ddot{u}_{mc}$ (Newton's second law), where $f_a$ as before represents the force exerted by the structure on the absorber, $M_{mc}$ as before represents the mass of the moveable mass 506 and $\ddot{u}_{mc}$ is the acceleration of the moving mass as measured by the accelerometer (in the same direction as $\ddot{u}_a$).

It will be appreciated that the use of a feedforward control system can allow perturbations in the system to be taken account of before their effect is felt in the system (in contrast to feedback control systems which rely on correcting errors observed in the output of the system). Thus the use of a feedforward control system can, in the right circumstances, provide a faster and more accurate response than a feedback system. The design of feedforward controllers is usually simpler than that of feedback controllers, and it is easier to achieve stability of the system.

Figure 6:
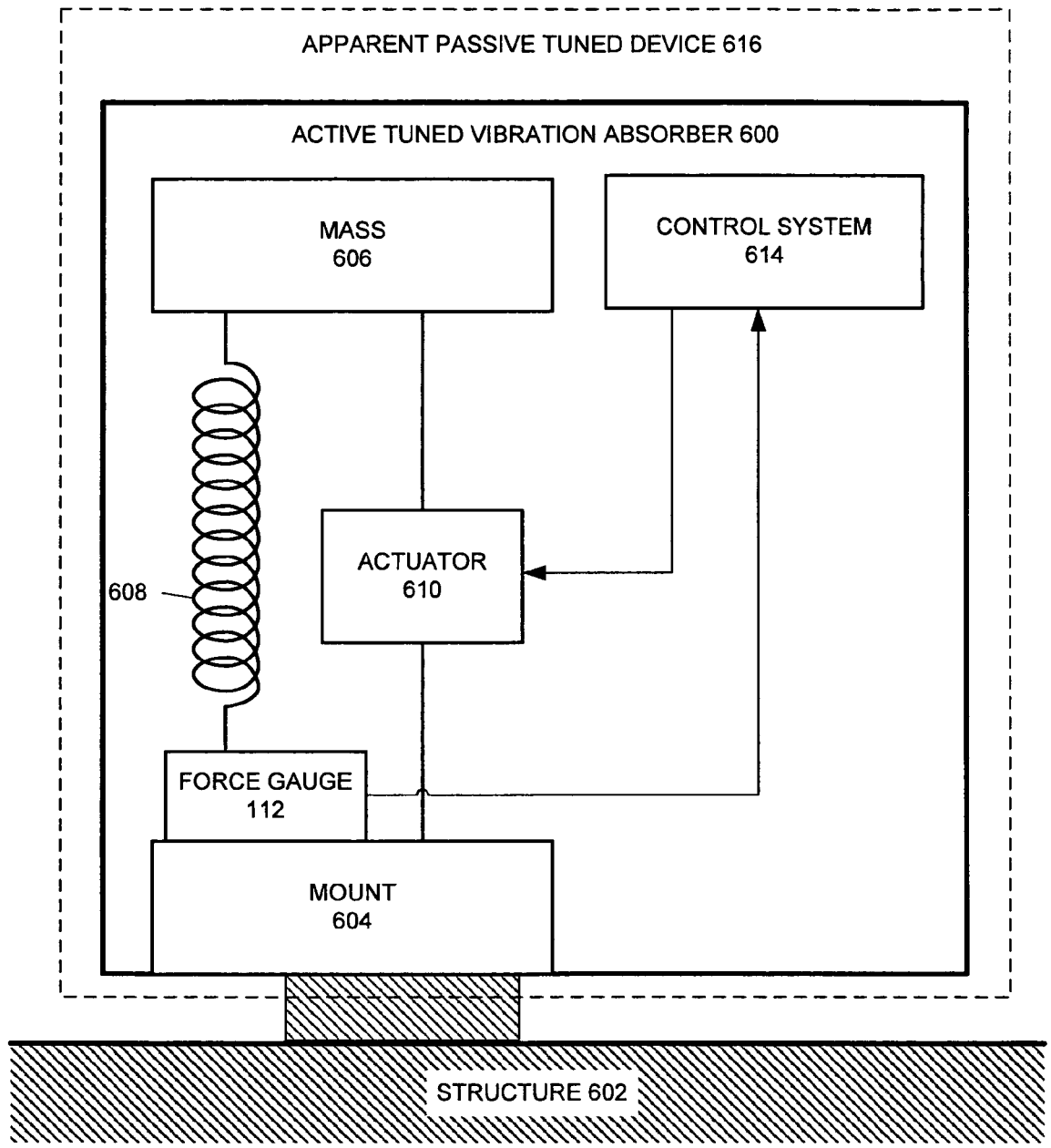
FIG. 6 is a schematic diagram of a further embodiment of the active tuned vibration absorber of FIG. 1.

FIG. 6 is a schematic diagram of a further embodiment of the active tuned vibration absorber of FIG. 1.

In this embodiment an active tuned vibration absorber 600 is shown attached to a structure 602 via the mount 604. A moveable mass 606 is attached to the mount 604 via a spring 608 and also via an actuator 610. A force gauge 612 is also provided on or proximate to the mount 604 as before. The actuator is controlled by a control system 614 in order to make the vibration absorber 600 appear to be substantially a passive device 616.

The control system 614 may be a feedforward control system as described above, or a feedback system.

As before, the force gauge 612 measures the force applied between the mount 604 and the moveable mass 606 (equivalent to the force applied between the structure 602 and the moveable mass 606). The control system 614 uses the force gauge measurement and any other suitable measurements to control the actuator to cause the mechanical impedance of the vibration absorber 600 to converge to the relevant target impedance.

It will be appreciated that the use of the force gauge 612 can simplify constructional details of the vibration absorber, since other arrangements may require sensors to be placed on the moveable mass 606 (the movement of the mass causing difficulty in transmitting the measurements to the control system 614) or otherwise interacting with moving parts of the vibration absorber (in the case of velocimeters and displacement meters, for example).

Other readings may be taken and/or estimations may be made in order to supply the control system 614 with further information to facilitate the generation of an actuator driving signal.

Figure 7:
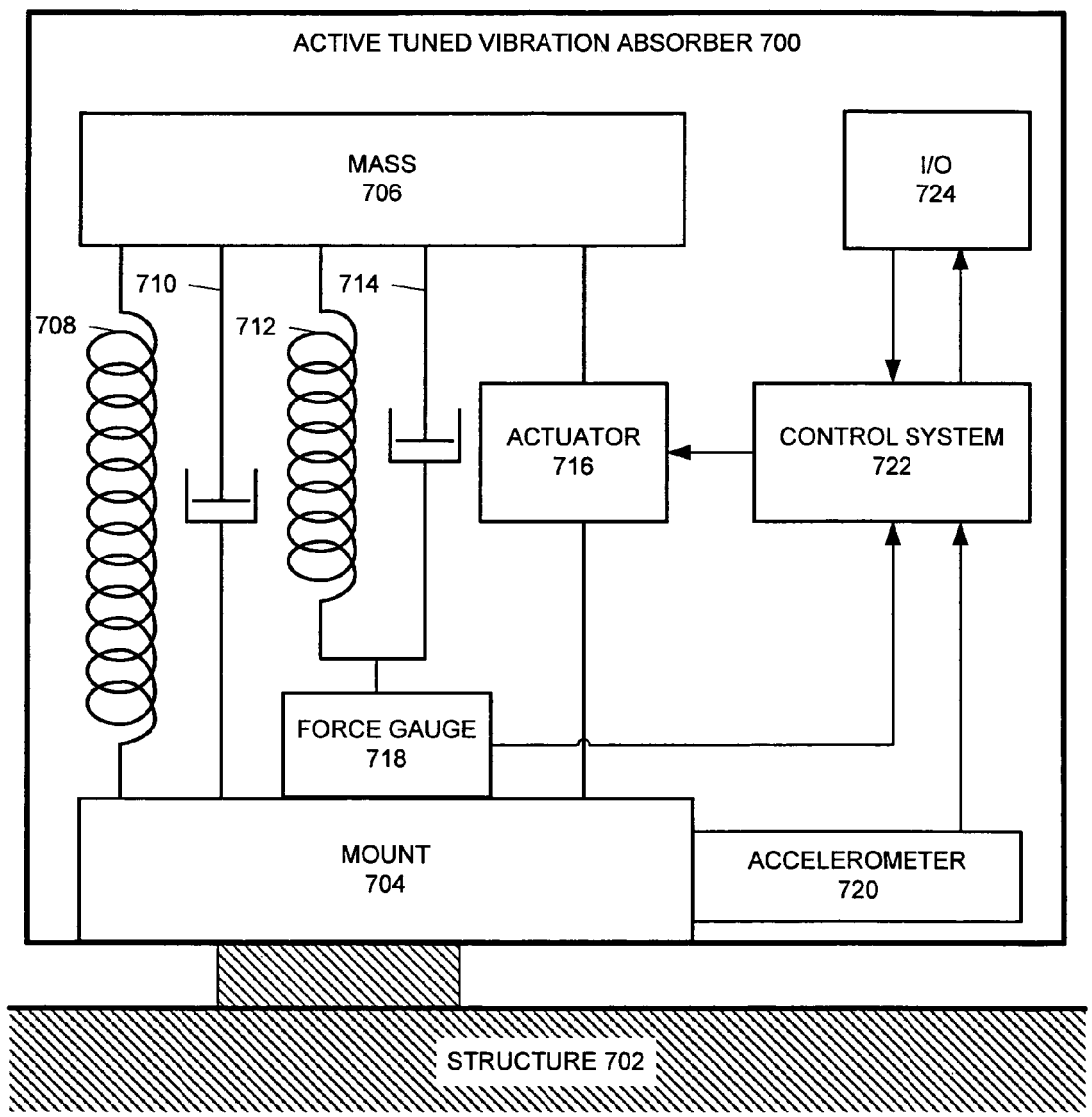
FIG. 7 is a schematic diagram showing the active tuned vibration absorber of FIG. 1 in more detail.

FIG. 7 is a schematic diagram showing the active tuned vibration absorber of FIG. 1 in more detail.

The active tuned vibration absorber 700 is again shown attached to a structure 702. The vibration absorber 700 includes a mount 704, a moveable mass 706, a first spring 708, a damper 710, a second spring 712 and second damper 714, an actuator 716, a force gauge 718, an accelerometer 720, a control system 722 and an input/output interface 724. The second spring 712 and second damper 714 are attached to the force gauge 718. The dampers 710, 714 dissipate energy by any suitable means, which may be hydraulic friction (dashpots) or internal energy losses in flexible energy absorbing material, for example. The dampers 710, 714 may alternatively represent internal damping within the springs 708, 712 respectively, for example.

The force gauge 718 measures only part of the force applied between the moveable mass 706 and the structure 702 (via the mount 704), but the total force applied between the moveable mass 706 and the structure 702 can be estimated from the force gauge signal with knowledge of the values of the components in the vibration absorber and sometimes additional information such as the accelerometer signal or a signal indicative of the force generated by the actuator.

The control system 722 operates as described earlier, and is in communication with the input/output interface 724, which is suitable for connection to a serial data bus, for example. The control system 722 can be controlled via the i/o interface 724 to turn the control system on and off, and to change the target impedance function T used in the control loop, for example. In the latter instance on an aircraft, for example, a remote system (not shown) can transmit information to the control system 722 regarding the current propeller or turbine speeds of the engines of the aircraft. This can allow the control system 722 to modify the $\omega_t$ variable (and also $Q_t$ if so desired) in the formula for T (see above) to match one of the components of the vibration related to the current propeller or turbine speed (which will likely constitute the largest components of vibration). For example, a 4-bladed propeller rotating at 600 rpm generates vibration components primarily at frequencies that are an integer multiple of 40 Hz, and an rpm signal could be used to modify the $\omega_t$ variable to coincide with one of these multiples (or harmonics). The relations between rpm and the frequencies of the primary components of vibration are not always integer multiples, particularly when the machine contains a gearbox or other speed-changing device, but the multiples are usually known and can be incorporated into the controller design.

Other arrangements of the components in the vibration absorber can be provided. For example, more or fewer springs and dampers can be provided, and interconnected in series and/or in parallel. In addition, multiple masses can be provided if necessary.

The embodiments described herein have components arranged to resonate in a defined orientation, but it is of course possible to have more than one resonant system (an arrangement of at least one mass, at least one spring and optionally at least one damper) in the vibration absorber, with different resonant systems being arranged in different orientations with respect to each other. However, normally it is sufficient to provide a simpler vibration absorber and to arrange multiple vibration absorbers in appropriate positions.

The embodiments described herein are also not limited to linear displacements. Appropriate modifications can if necessary be made to counter rotational vibrations (for example by hinging the mass about a pivot point).

The actuator 716 is a low impedance actuator (i.e. a displacement of its armature requires little or no force). In this embodiment a moving coil actuator is used but other types are of course possible. A high impedance actuator can equally be used. An example of a system including such an actuator will now be described.

Figure 8:
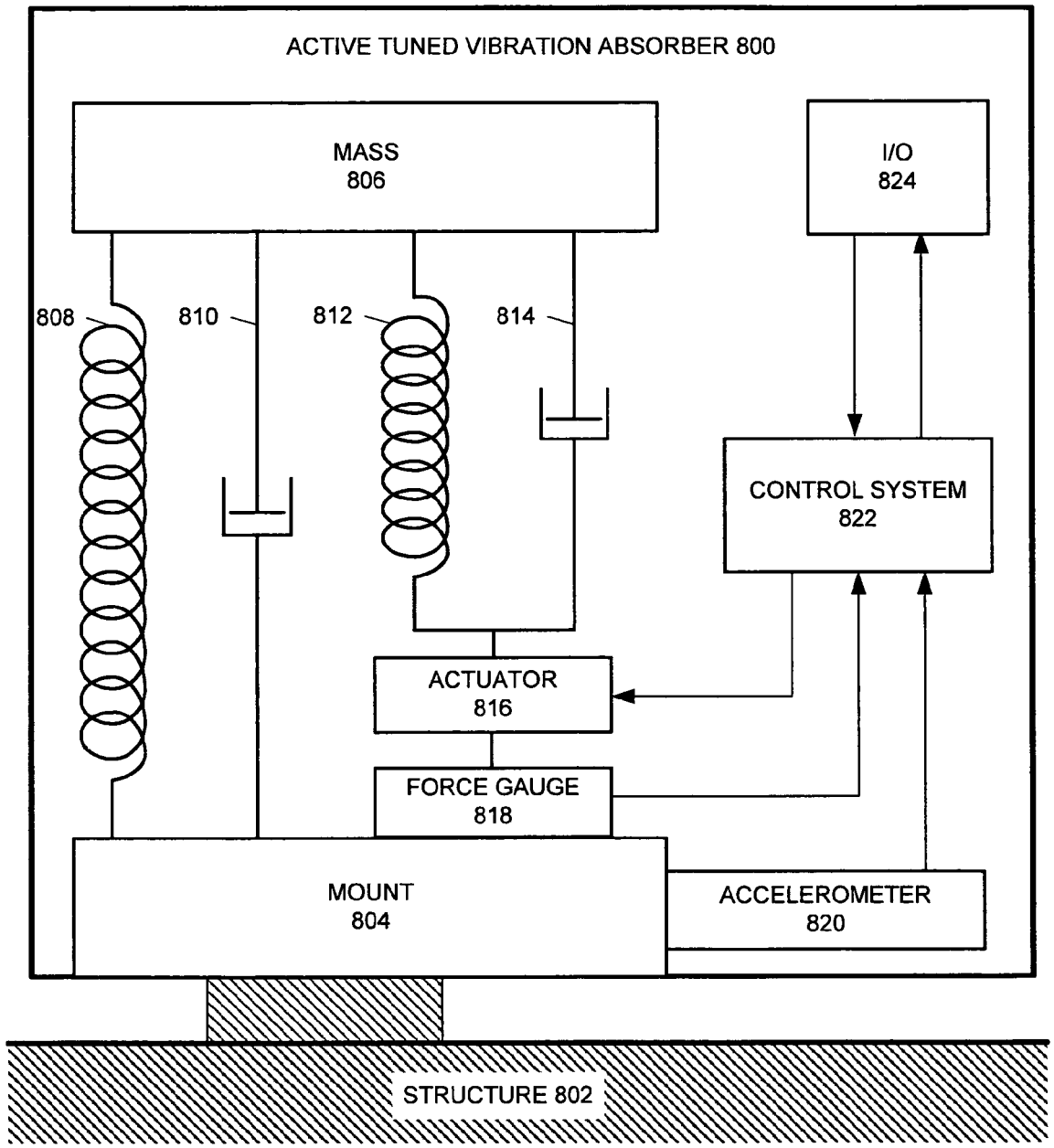
FIG. 8 is a schematic diagram showing an alternative arrangement of FIG. 7 using a high impedance actuator.

FIG. 8 is a schematic diagram showing an alternative arrangement of FIG. 7 using a high impedance actuator.

The active tuned vibration absorber 800 is again shown attached to a structure 802. The vibration absorber 800 includes a mount 804, a moveable mass 806, a first spring 808, a damper 810, a second spring 812 and second damper 814, a high impedance actuator 816, a force gauge 818, an accelerometer 820, a control system 822 and an input/output interface 824. The second spring 812 and second damper 814 are attached to the force gauge 818. As before, the dampers 810, 814 may alternatively represent internal damping within the springs 808, 812 respectively, for example.

The actuator 816 is a high impedance type is mounted in series with the moving mass suspension components (rather than in parallel, as with previous embodiments). The actuator 816 may, for example, be a stack of piezoelectric elements.

This type of actuator transmits external forces through its armature with very little extension or compression of the armature.

Figure 9:
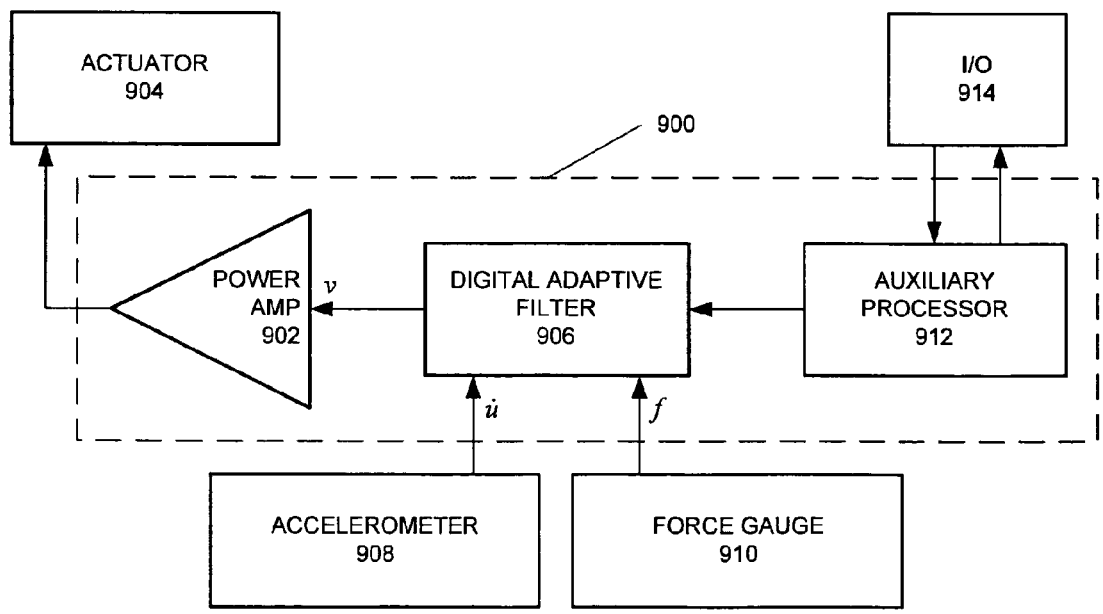
FIG. 9 is a schematic diagram illustrating the hardware components associated with the control system of FIG. 7.

FIG. 9 is a schematic diagram illustrating the hardware components associated with the control system of FIG. 7.

The control system 900 and related elements are shown in the figure. The control system 900 includes a power amplifier 902, driving the actuator 904, a digital adaptive filter unit 906, receiving inputs from an accelerometer 908 and a force gauge 910, and an auxiliary processor 912, in communication with the input/output interface 914.

The digital adaptive filter 906 and the auxiliary processor 912 may be combined in the same physical device. The control system includes other components that are not shown for clarity, including anti-aliasing filters, sample-and-holds, analogue-to-digital converters, transceivers, and so on.

The operation of the control system 900 will now be described in more detail.

Figure 10:
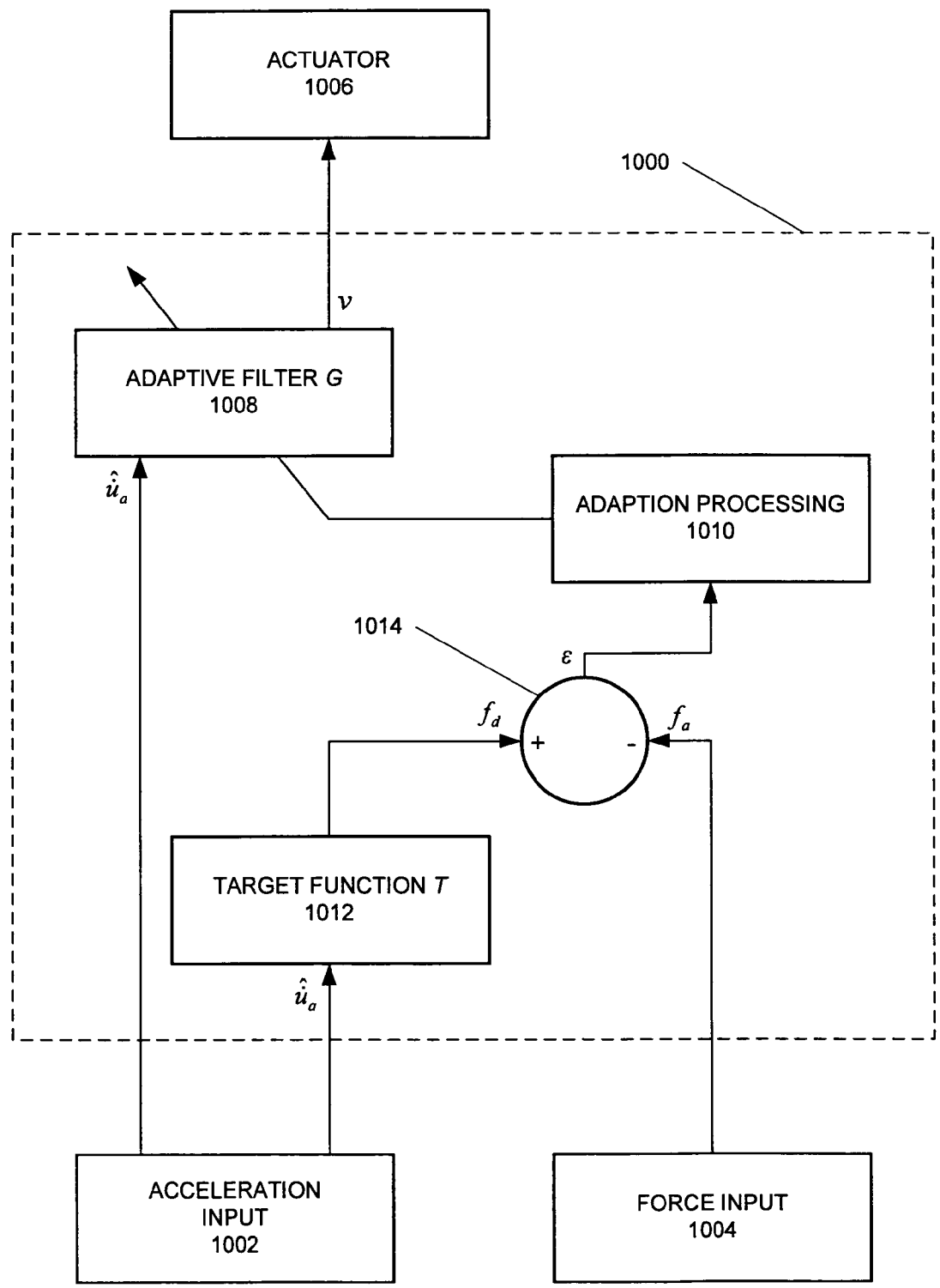
FIG. 10 is a schematic diagram illustrating the processing steps carried out by the control system of FIG. 7.

FIG. 10 is a schematic diagram illustrating the processing steps carried out by the control system of FIG. 7.

The control system core 1000 receives an input $\hat{u}_a$ 1002 indicative of the estimated acceleration of the structure in the vicinity of the vibration absorber, and also receives an input $\hat{f}_a$ 1004 that is an estimate of the force applied between the structure and the vibration absorber. The control system outputs a signal v for driving the power amplifier connected to the actuator. As mentioned previously, the output v is amplified by a power amplifier (not shown) included in the block 1006.

The output v is generated by a feedforward adaptive filter 1008, that transforms the acceleration signal $\hat{u}_a$ into the output v. The filter 1008 applies a filter G to the input signal, and the filter G is adapted by the adaption processing unit 1010.

In processing unit 1012, the acceleration signal $\hat{u}_a$ is filtered by the target filter T to produce the desired force $f_d$. The processing unit 1014 then subtracts the estimated force $\hat{f}_a$ from the desired force to generate an error signal ϵ. The error signal ϵ is then used by the adaption processing unit 1010 to determine how the filter G 1008 should be adapted in order to reduce the magnitude of the error.

During operation, if it is desired to change the target impedance function T (for example because the main frequency of vibration of the structure has changed), the increase in the error signal ϵ will cause the adaption processing unit 1010 to adapt the filter G 1008 until the vibration absorber is driven (via the actuator 1006) in the desired fashion and the error signal reduces again.

In the present embodiment the processing operations shown in FIG. 10 are carried out by the digital adaptive filter unit 906 of FIG. 9.

Figure 11:
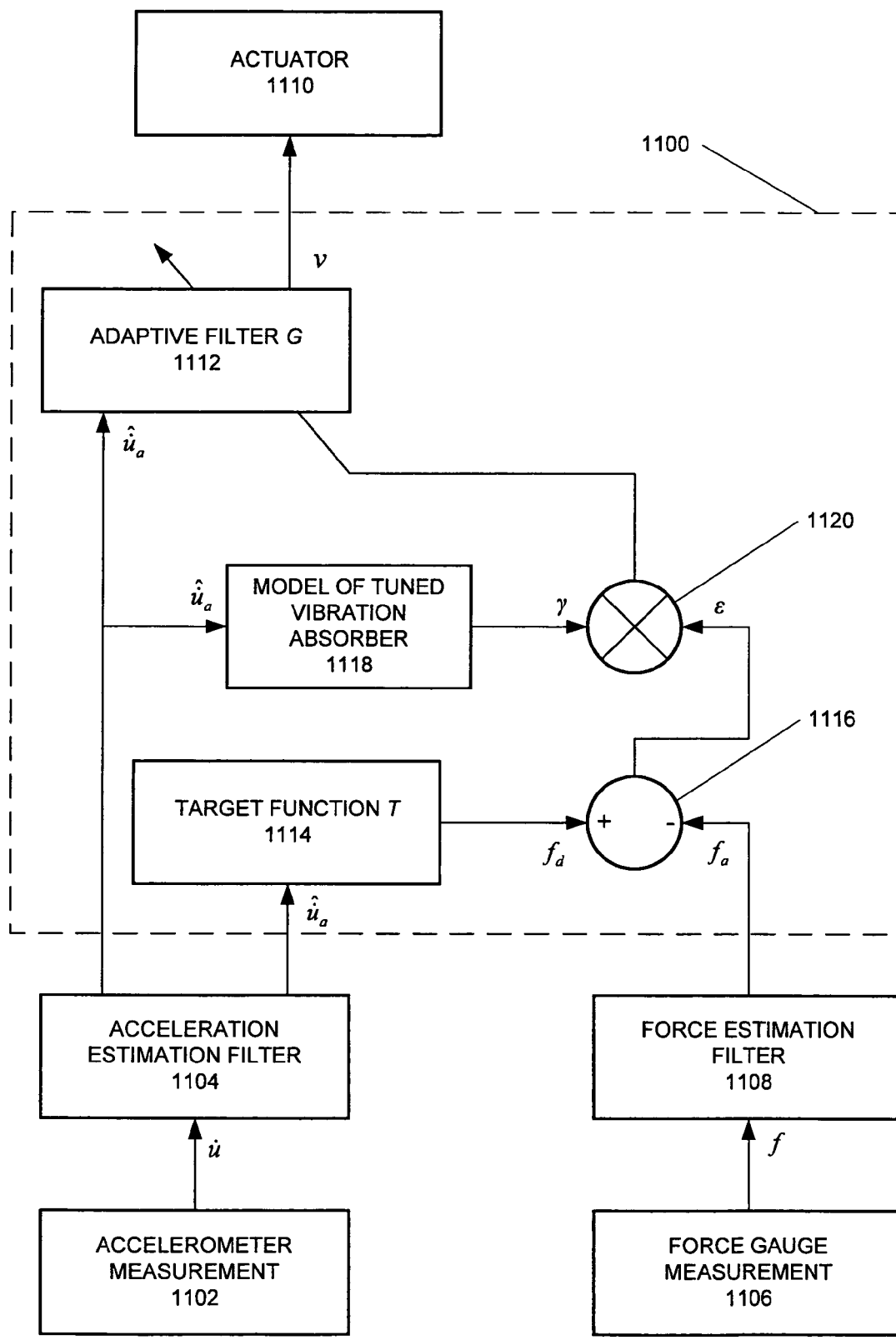
FIG. 11 is a schematic diagram illustrating the processing steps of FIG. 10 in more detail.

FIG. 11 is a schematic diagram illustrating the processing steps of FIG. 10 in more detail.

The control system core 1100 is again shown. The accelerometer measurement $\dot{u}$ 1102 and the force gauge measurement $f$ 1106 are fed into the control system (not shown). The accelerometer measurement $\dot{u}$ is transformed into the acceleration estimate $\hat{u}_a$ by filtering with the acceleration estimation filter $\hat{U}$ 1104. The response of the accelerometer can vary with frequency, and the filter $\hat{U}$ can provide the necessary equalisation of the signal. The (partial) force measurement $f$ is transformed into the (total) force estimate $\hat{f}_a$ by filtering with the force estimation filter filter $\hat{F}$ 1108. Again, the actuator 1110 is driven with a signal v output by the adaptive filter G 1112.

As before, the acceleration signal $\hat{u}_a$ is filtered by the target filter T 1114 to produce the desired force $f_d$. Again, the processing unit 1116 subtracts the estimated force $\hat{f}_a$ from the desired force to generate an error signal ϵ.

The acceleration signal $\hat{u}_a$ is also filtered by a model $\hat{K}_2$ 1118 of the tuned vibration absorber to produce a filtered reference γ. The filtered reference γ and the error signal ϵ are cross-correlated by the processing unit 1120 to determine how the filter G 1112 should be adapted. A least mean squares (LMS) method can be used to adapt the filter G, but other methods may of course be used (see for example P A Nelson and S J Elliott, Active Control of Sound, Academic Press 1993 ISBN 0-12-515426-7 Chapter 4, the contents of which are hereby incorporated by reference).

The operation of the adaption processing will briefly be explained in more detail.

The combination of the adaptive filter G 1112 and the power amplifier (not shown) take the acceleration signal $\hat{u}_a$ 1102 as an input, and provide the actuator 1110 driving signal v as an output. The actuator 1110 influences the motion of the system and in turn has an impact on the accelerometer measurement. Thus a physical feedback loop is created, which can be expressed in the following equation, in which variables are to be considered as functions of frequency:

$$f_a = K_1 \dot{u}_a + K_2 v,$$

where $K_1$ and $K_2$ are transfer functions that can be determined using knowledge of the components of the vibration absorber (such as the mass size, spring constants and damping constants) and knowledge of the behaviour of the power amplifier (such as the amplification ratio).

The output of the adaptive filter 1112 is given by:

$$v = G\hat{u}_a,$$

and the defined target behaviour of the vibration absorber is given by:

$$\frac{f_a}{\dot{u}_a} = T.$$

Rearrangement of the above three equations gives the formal result for the desired adaptive filter, which in practice may be achieved only in relatively narrow bands of frequencies where it is important that the target relationship be satisfied:

$$G_{desired} = \frac{T - K_1}{K_2}.$$

$K_2$ depends on physical parameters that may vary or may not be known exactly. It can be computed from a model, or measured. In the time-domain, the filter $K_2$ 1118 can usually be implemented as a recursive filter with few coefficients.

Conveniently, $K_1$ and $K_2$ do not depend on any properties of the structure to which the vibration absorber is to be attached. This can simplify the design of the overall control system because (for example) vibration absorbers do not have to be customised to operate in a particular location on the structure. Nevertheless it is possible to program the vibration absorbers to utilise a particular choice or range of target impedance functions T (or otherwise to vary the behaviour, of the vibration absorber) depending on a 'slot' to which the vibration absorber is attached (the slot in question may be automatically detected by the input/output interface of the vibration absorber, for example).

The filter $\hat{F}$ 1108 is a filter that is also based on estimated parameters of the vibration absorber. For example, in the embodiment of FIG. 1, if the spring 108 has a compliance $C_{ms}$, the filter $\hat{F}$ 1108 could be defined in the frequency domain as:

$$\hat{F} = -\omega^2 \hat{M}_{mc} \hat{C}_{ms}.$$

This approximation relies on the velocity of the structure being negligible compared to the velocity of the moving mass (which is normally true in practice). The gain of $\hat{F}$ 1108 would normally be "rolled off" at frequencies above the range of interest to prevent it growing indefinitely with frequency.

The filter $\hat{F}$ 1108 can be derived by other means. For example, the force exerted by the actuator can be estimated and summed with the output of the force gauge.

In more detail, the force $f_i$ exerted by a moving coil actuator can be determined by the formula $f_i = Bli$, where $i$ is the current in the coil of the actuator, and $Bl$ is the 'force factor' of the actuator. The force estimate $\hat{f}_a$ used as the input to the processing unit 1116 can then be computed from the following equation:

$$\hat{f}_a = f + \hat{B}\hat{l}i,$$

where $f$ is the force measured by the force gauge and the carets (^) as usual indicate "estimate of". This method requires a measurement of the current in the actuator to be input into the control system (or, alternatively, a constant-current power amplifier can be used). Other methods of estimating $\hat{f}_a$ are of course possible, which may take into account the effect of other springs and dampers in the vibration absorber.

Alternatively, the components of the vibration absorber can be rearranged so that all of them act on the mount via the force gauge, so that the force gauge measures the total force between the moveable mass and the structure and no transformation is required (other than for calibration purposes).

One drawback of the control system of FIG. 11 is that the filter G has a relatively long impulse response (since it models a highly resonant system that will have a lot of 'ringing'). If modelled as a finite impulse response (FIR) filter, many coefficients may be required. Not only does this increase the processing power and complexity of the system, but also it potentially reduces the stability, because the error signal and the filtered reference are usually very narrow-band signals. Therefore, there is very little information in them to adjust the many coefficients of G, and this can lead to problems with the convergence of the filter. Alternatively G can be modelled with a recursive filter (IIR) with few coefficients, but this can cause problems with keeping the system stable and convergent as G is adjusted.

It was found that these performance and stability issues could be overcome by modifying the control system.

Figure 12:
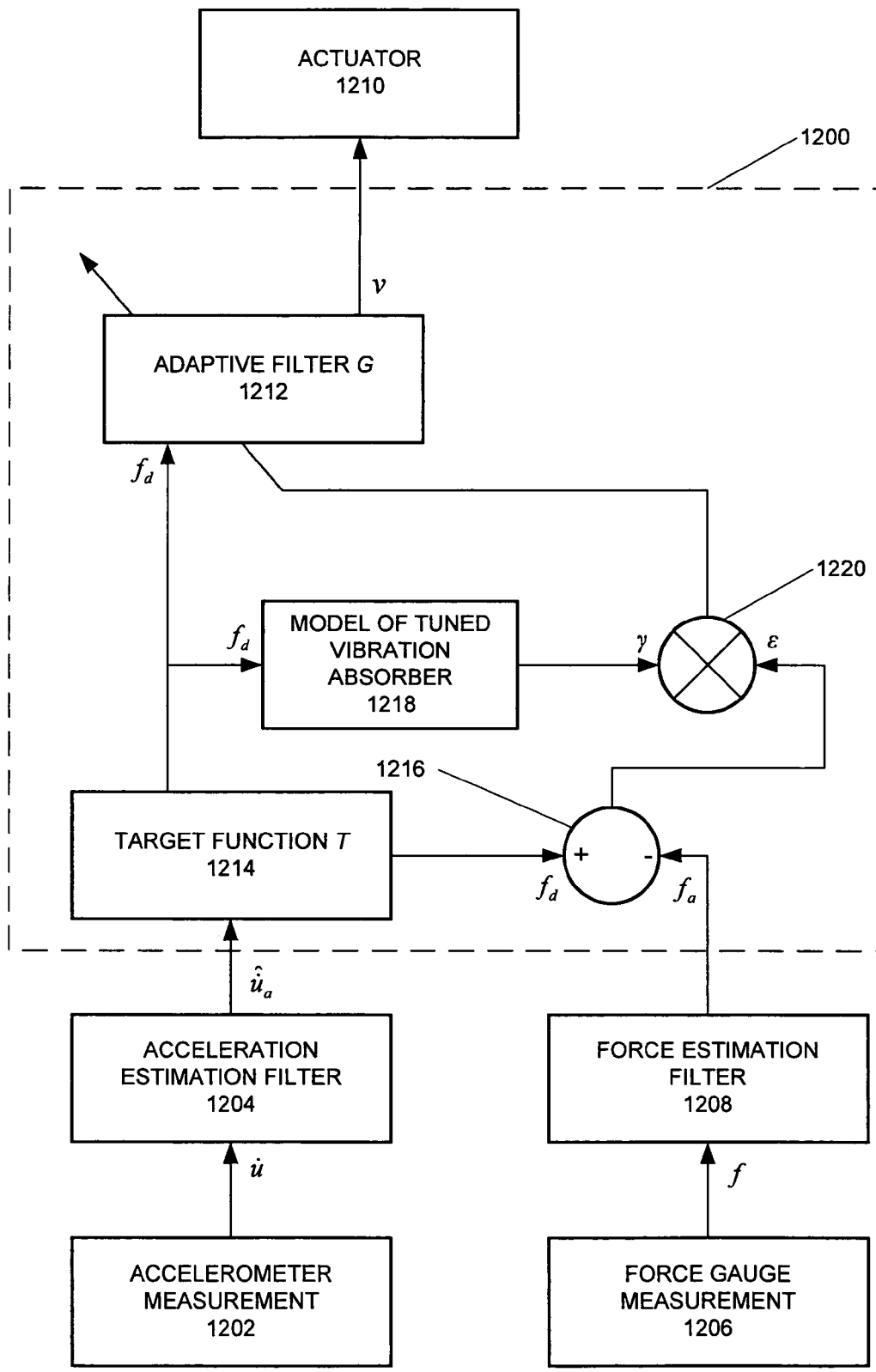
FIG. 12 is a schematic diagram illustrating an alternative arrangement of the processing steps of FIG. 11.

FIG. 12 is a schematic diagram illustrating an alternative arrangement of the processing steps of FIG. 11.

The control system core 1200 is again shown.

The accelerometer measurement ù 1202 and the force gauge measurement $f$ 1206 are fed into the control system (not shown). The accelerometer measurement ù is transformed into the acceleration estimate $\hat{u}_a$ by filtering with the acceleration estimation filter $\hat{U}$ 1204. The (partial) force measurement $f$ is transformed into the (total) force estimate $\hat{f}_a$ by filtering with the filter $\hat{F}$ 1208. Again, the actuator 1210 is driven with a signal v output by the adaptive filter 1212.

As before, the acceleration signal $\hat{u}_a$ is filtered by the target filter T 1214 to produce the desired force $f_d$. Again, the processing unit 1216 subtracts the estimated force $\hat{f}_a$ from the desired force to generate an error signal ϵ.

In contrast to the system of FIG. 11, the inputs of the model $\hat{K}_2$ 1218 of the tuned vibration absorber and the adaptive filter G 1212 are connected to the output of the target filter T 1214 (instead of the acceleration signal $\hat{u}_a$). Then, as before, the model $\hat{K}_2$ 1218 produces a filtered reference γ, which is cross-correlated with the error signal ϵ by the processing unit 1220.

Thus the output v of the control system is now equal to:

$$v = GT\hat{u}_a$$

This is not an obvious modification to make, but it has benefits. It has been found that for the types of mechanical impedance target function T likely to be chosen for an active tuned vibration absorber, G can be adequately modelled in the present embodiment by a very sparse FIR filter (that is, a filter with as few as two non-zero coefficients). The limited information in the error and filtered reference signals is ideally suited to adapting G, and a standard method such as "filtered-x LMS" adjustment will work robustly.

It is also possible to have a different non-adapting filter, T', in series with G so that $$v = GT'\hat{u}_a$$

T' is similar to T in the critical frequency range around the resonance frequency of the vibration absorber, and G can still require very few non-zero coefficients. In this case, in FIG. 12, blocks 1212 and 1218 would be fed by $\hat{u}_a$ filtered through T' rather than T, but block 1216 would still be fed by $\hat{u}_a$ filtered through T. However, more computation is required because $\hat{u}_a$ has to be filtered both through T and through T'. T (and T') can usually be implemented efficiently as recursive (IIR) filters rather than FIR filters.

It should be clarified that the mechanical impedance target function filter T (and T' if used) is not adjusted in the same way that the filter G is, but it may still need to be time-varying. For example, when some form of speed or frequency signal is available to the control system, the coefficients of the T filter can be recomputed (or looked-up from a pre-calculated table) depending on the frequency. Provided the frequency change is not too fast, G can simply adapt to keep the vibration absorber performing properly. If the frequency change is fast, consideration needs to be given to the transient behaviour of the system, and it may be necessary, for example, to reduce the gain or rate of adaptation of G when the rate of change of frequency is large.

The control system may include an additional component that analyses signals from the accelerometer and/or force gauge to determine the main frequencies of vibration in the structure, and to make a corresponding change to the target impedance function to track the detected frequencies. As an example, a bank of fixed narrowband filters with closely-spaced centre-frequencies could all receive the reference signal as input. Only those filters with centre-frequencies corresponding to important vibration components will have significant outputs, so this is one way of finding the frequencies of those components. When some form of spectral analysis such as this is being used to detect frequencies, one of the problems is that the controller itself, as it is adapting, tends to spread the spectrum of the reference signal. This can make the frequency detection less robust. One way of reducing these problems is to look for the frequency of a harmonic of the component of vibration, rather than for the component itself, choosing a harmonic that is not being controlled. So, for example, if a vibration absorber is being targeted on a vibration component variable around 100 Hz, it may be preferable to identify the frequency of e.g. its $6^{th}$ harmonic (which is not being controlled by any other absorber), provided, of course that the $6^{th}$ harmonic is clearly present in the reference signal (such as the acceleration signal). The actual frequency of the desired component is then obtained by division by the harmonic number. Another advantage of this scheme is that the change in frequency of a higher harmonic of a vibration can be detected more quickly than the change in the fundamental frequency.

In some cases, a phase-locked-loop can also be used.

It may also be that the vibrations in the structure move rapidly among a few set frequencies (this is typical of modern turbo-propeller engines, for example). In this case a further refinement may be desirable, as discussed with reference to FIG. 13.

Figure 13:
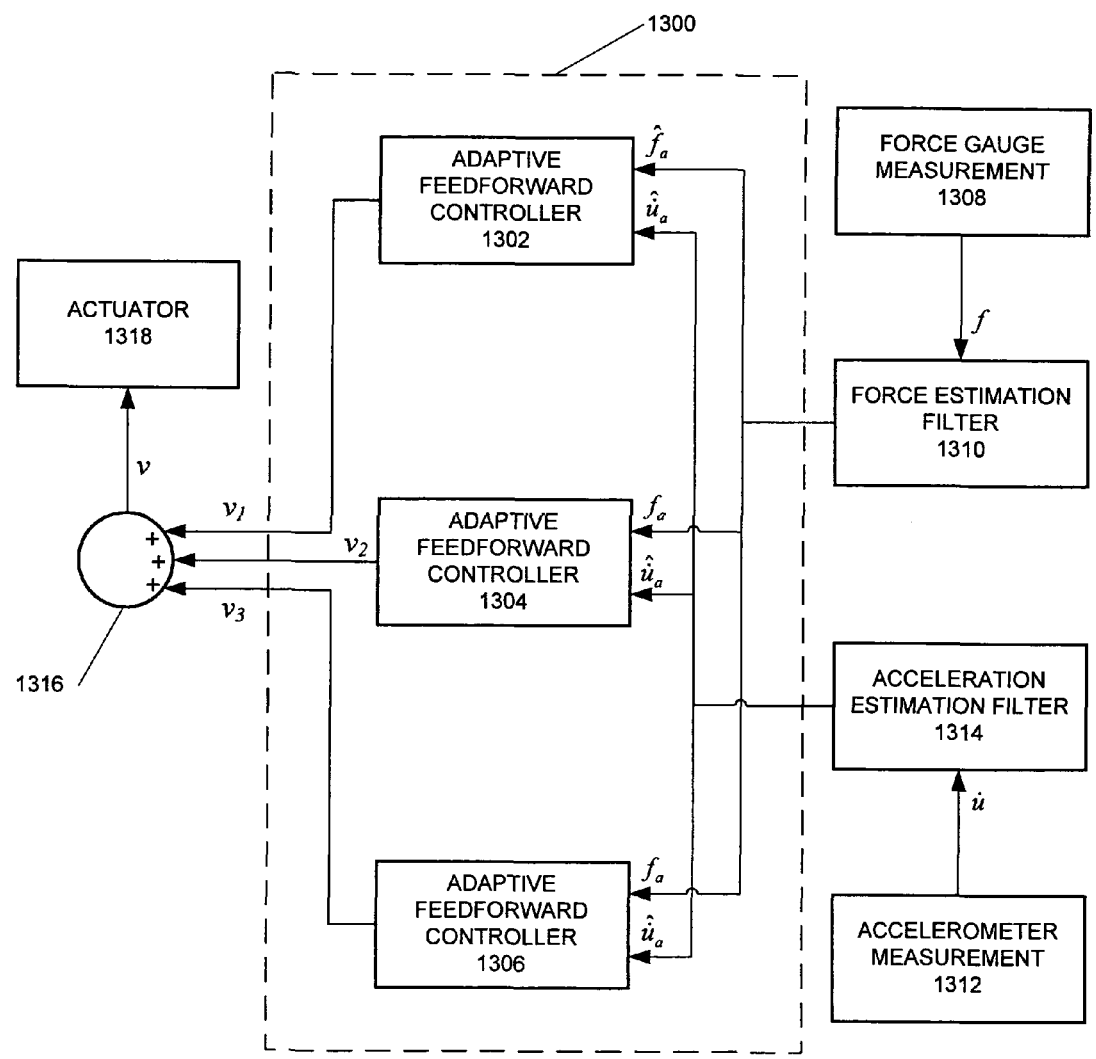
FIG. 13 is a schematic diagram of a modified control system including multiple adaptive feedforward controllers.

FIG. 13 is a schematic diagram of a modified control system including multiple adaptive feedforward controllers of the type previously described. The control system 1300 includes three separate control system cores 1302, 1304, 1306, each core containing the components shown in item 1200 of FIG. 12, for example. As before, the force gauge measurement $f$ 1308 is converted into the total force estimate $\hat{f}_a$ by filtering through filter $\hat{F}$ 1310, and fed into each of the control cores 1302, 1304, 1306. An accelerometer measurement ù 1312 is converted by the acceleration estimation filter $\hat{U}$ 1314 into an acceleration signal $\hat{u}_a$ which is also fed into the cores 1302, 1304, 1306. The output signals $v_1$, $v_2$, $v_3$ of the cores are then summed by the processing unit 1316 and the overall driving signal v is transmitted to the actuator 1318 (via a power amplifier, not shown).

Each of the control system cores 1302, 1304, 1306 incorporates a different target mechanical impedance function T. Each of the target functions T is customised for a particular one of a set of expected frequencies of vibration. Because the response of each of the subsystems is normally only significant throughout a relatively narrow band of frequencies relative to the spacing between the frequencies being tracked, normally only one of the control cores produces a significant response at any time. In addition, however, it is usually necessary to ensure that only one of the G filters is adapted at any particular time. This can be achieved by monitoring the short-term average power in the filtered reference signals and adjusting only the section with the highest power. The coefficients in the non-adjusting sections are "leaked away" (successively reduced) so that they become unimportant over time. Other appropriate methods of coordinating the responses of the control cores 1302, 1304, 1306 can of course be used.

A further refinement of the control system will now be described.

Figure 14:
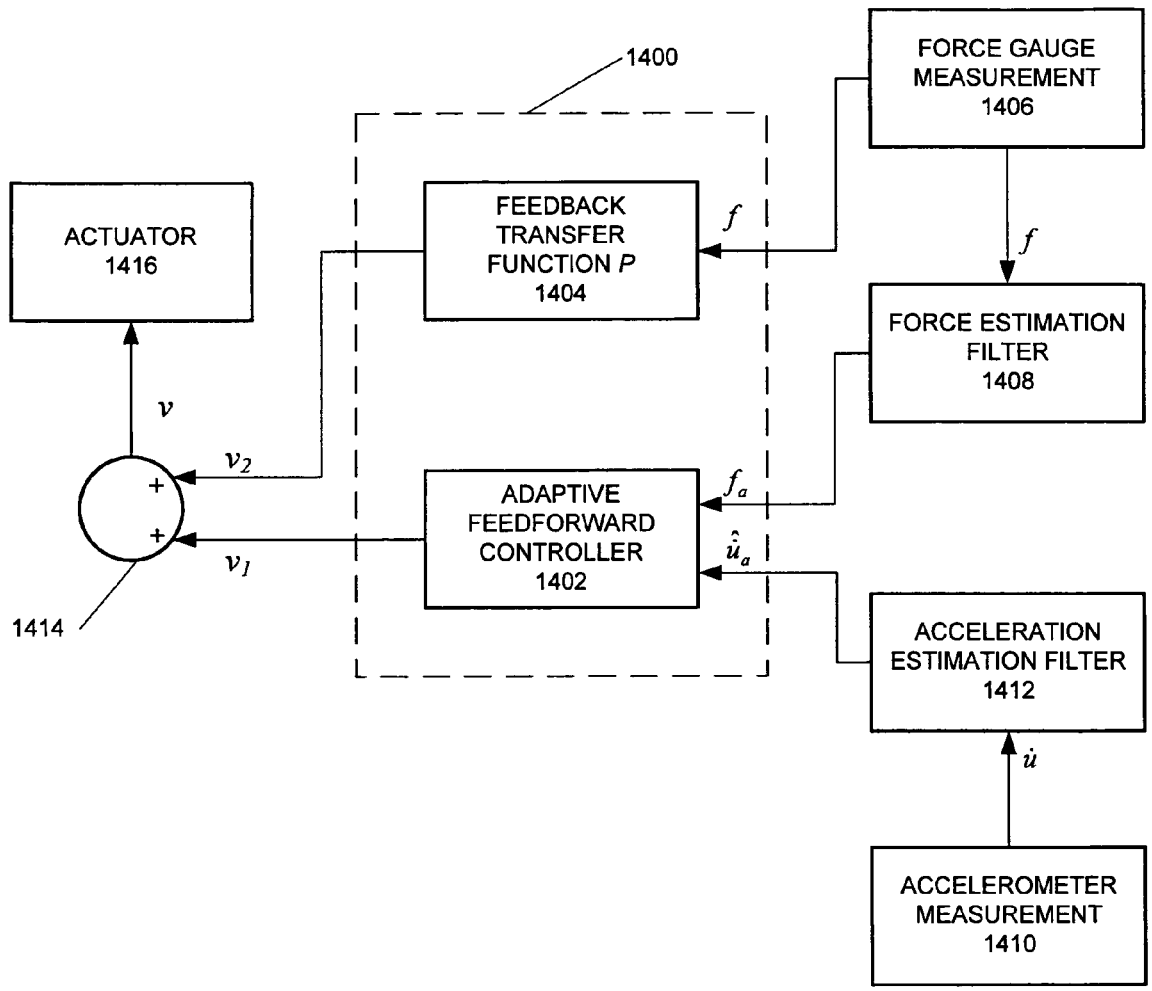
FIG. 14 is a schematic diagram of an embodiment in which both a feedback controller and a feedforward controller are provided.

FIG. 14 is a schematic diagram of an embodiment in which both a feedback controller and a feedforward controller are provided.

The control system 1400 includes an adaptive feedforward controller 1402 as described above, and also includes a feedback transfer function P 1404 that takes the measured force 1406 as an input. As before the force 1406 is converted into the estimate of total force $\hat{f}_a$ by filtering with filter $\hat{F}$ 1408. As before, an accelerometer measurement ù 1410 is converted by the acceleration estimation filter U 1412 into an acceleration signal $\hat{u}_a$, which is fed into the controller 1402. The output $v_1$ of the feedforward controller 1402 and the output $v_2$ of the feedback transfer function P 1404 are then summed by the processing unit 1414, and used to drive the actuator 1416.

The feedback transfer function filter P 1404 is typically a simple filter with few coefficients. The filter P provides a form of motional feedback (an example of which is given in U.S. Pat. No. 3,798,374, the content of which is hereby incorporated by reference), and the filter coefficients can be selected as appropriate to provide the desired degree and quality of feedback.

The effect of the transfer function P 1404 is typically to supply 'electronic damping' in the frequency range around the natural resonance frequency of the vibration absorber. This lowers the effective Q of the vibration absorber components as viewed by the feedforward controller 1402. This makes the feedforward controller easier to design and reduces the sensitivity to errors In this embodiment the filter P 1404 takes the force gauge reading $f$ as its input, but other inputs related to the motion of the moving mass could also be used.

It is possible to combine a plurality of the active tuned vibration absorbers described in the various embodiments above in order to provide a centrally controlled vibration reduction system (such as an anti-noise system for an aircraft). The vibration absorbers can also be operated in different modes. For example, the vibration absorbers may be used in one mode simply as remote actuators in a structure-wide noise reduction system. In another mode, the vibration absorbers can 'fall back' to local control, operating as described above. This latter mode can provide a useful redundancy in the event of a failure of the central system. Such a system will now be described.

Figure 15:
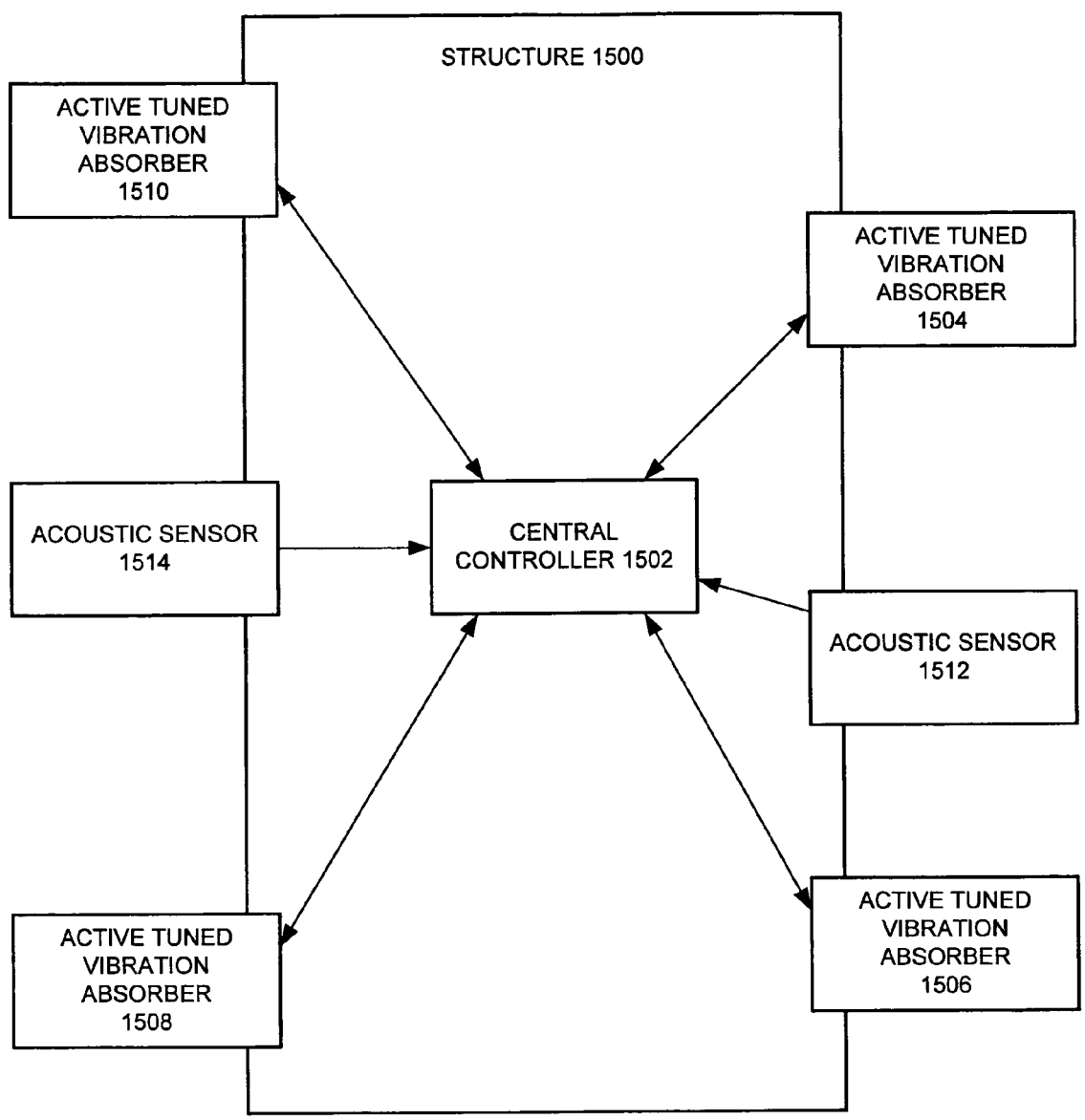
FIG. 15 is an illustration of a noise reduction system in which a plurality of active tuned vibration absorbers are controlled by a central control system.

FIG. 15 is an illustration of a noise reduction system in which a plurality of active tuned vibration absorbers are controlled by a central control system.

The structure 1500 may be any fixed or mobile structure, such as a bridge, building, aircraft or other vehicle. A central controller 1502 is provided, which is connected to a plurality of active tuned vibration absorbers 1504, 1506, 1508, 1510 of any of the various embodiments described above, and a number of acoustic sensors 1512, 1514. The devices are interconnected by a suitable network, such as a CANBUS serial data network.

During operation, the central controller takes measurements of noise and/or vibration levels from the sensors 1512, 1514. The controller then processes the measurements and outputs control signals to each of the vibration absorbers 1504, 1506, 1508, 1510. The vibration absorbers act on the control signals to vary their respective outputs v. By suitable control of the vibration absorbers 1504, 1506, 1508, 1510 the central controller can implement a large-scale and comprehensive vibration control system, for example using a vibration absorber in one part of the structure to achieve a target magnitude of vibration/noise in another part. One objective may be to adapt the outputs of the vibration absorbers in order to constrain the magnitude of acoustic emissions detected by one or both of the acoustic sensors 1512, 1514 to within a predetermined maximum level. Thus the acoustic sensors 1512, 1514 could be placed in a passenger cabin of an aircraft, for example, and the system could aim to keep the engine noise to below a predetermined level in the cabin.

Each vibration absorber monitors communications with the central controller 1502. Should the communications fail or be inactive for a predetermined period of time, each vibration absorber enters into a 'local control' mode where a fallback target impedance function is employed that is substantially dissipative (usually equivalent to a passive vibration absorber) to ensure stability in the absence of central control. In the 'local control' mode the vibration absorber can utilise signal estimation processing to allow it to track a major frequency of vibration, as discussed earlier, or use the method of FIG. 13 where there is a set of prescribed possible vibration frequencies. Central control can be re-established as necessary should the communications link be restored.

In addition, the active tuned vibration absorbers can transmit to the central controller, on a periodic or polled basis, readings from their force gauges and/or accelerometers. Thus the active tuned vibration absorbers can provide an 'intelligent' network of force gauges and/or an 'intelligent' network of accelerometers. These networks can be used as an alternative or in addition to the vibration reduction functions of the vibration absorbers in order to assist with crack detection, fatigue and stress measurement applications and the like. The accelerometer and/or force gauge readings may also be used in place of the acoustic sensors 1512, 1514 for example.

As mentioned previously, it is possible to program the vibration absorbers to utilise a particular choice or range of target impedance functions T (or otherwise to vary the behaviour of the vibration absorber) depending on a 'slot' to which the vibration absorber is attached (the slot in question may be automatically detected by the input/output interface of the vibration absorber, for example).

Figure 16A:
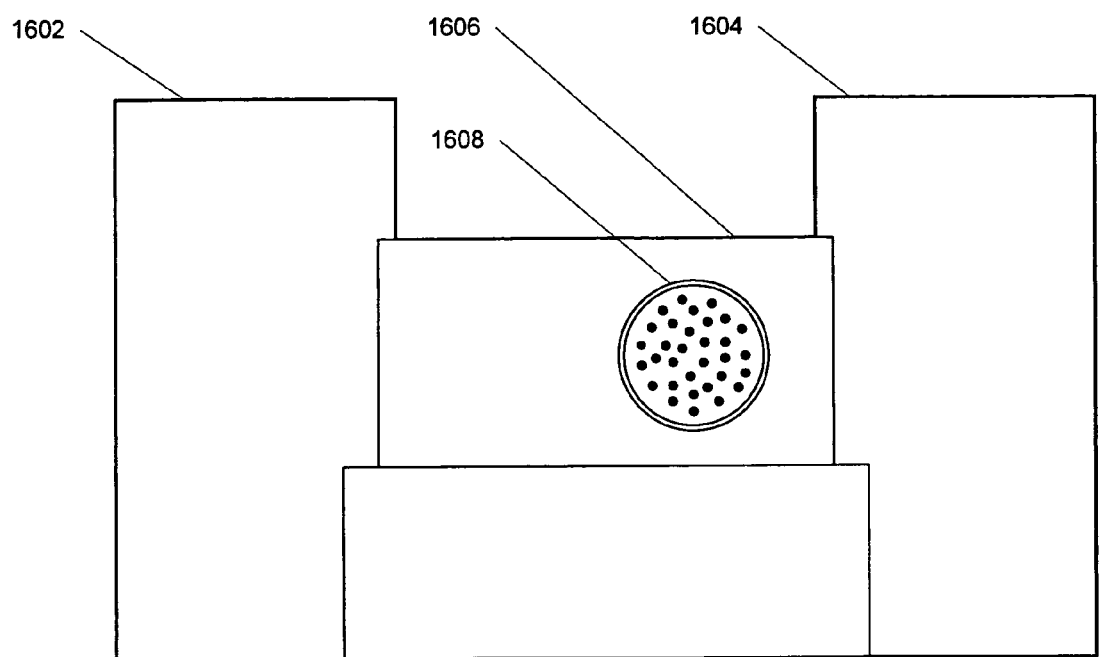
FIGS. 16A and 16B are front and top views of an example device incorporating the active tuned vibration absorber of FIG. 7.
Figure 16B:
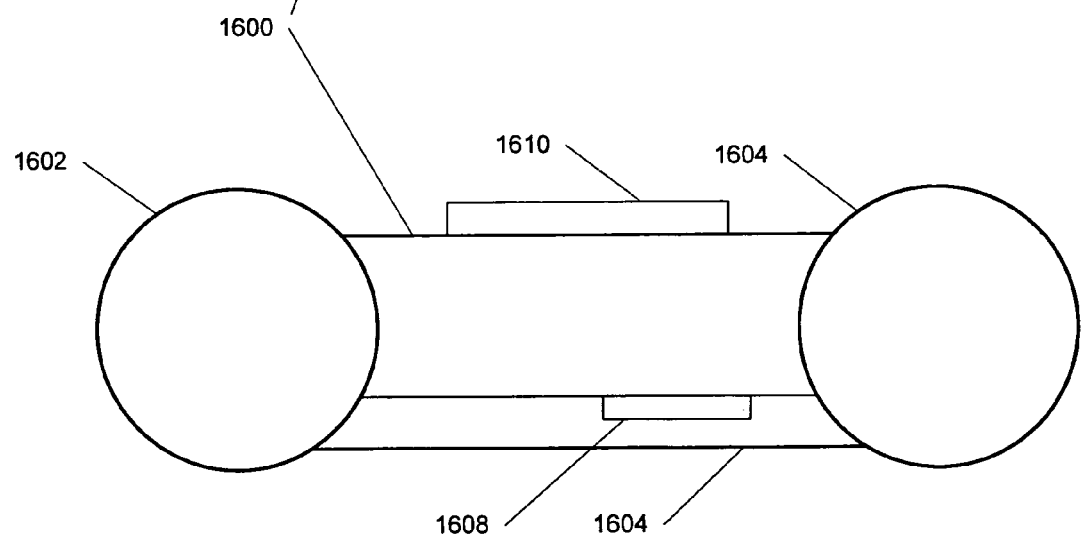

FIGS. 16A and 16B are front and top views of an example device incorporating the active tuned vibration absorber of FIG. 7. The device is suitable for use on an aircraft with a CANBUS data network.

The device 1600 includes two mass and spring systems enclosed in the two portions 1602, 1604. Each of the portions 1602, 1604 also includes a moving coil actuator, where a wire coil is fixed in place, and a permanent magnet (which is the moving mass) that travels freely relative to the coil. A force gauge is provided at the base of both of the portions 1604. An accelerometer (not shown) is also provided within the device. The internal resistance of the springs supporting the permanent magnets provides sufficient damping; further damping elements are not provided. An interface 1608 allows for connection to the CANBUS network, and supplies both power and communications needs. A support 1610 is provided on the rear of the device, for attachment to a strut within the fuselage. The device 1600 is designed to counter vibrations in a vertical orientation (with respect to the front view).

Figure 17A:
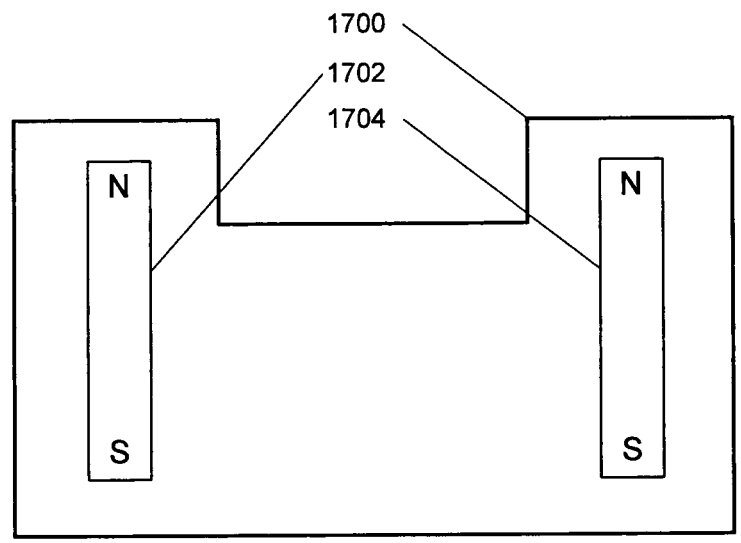
FIGS. 17A and 17B are schematic illustrations of different arrangements of permanent magnets within the device of FIGS. 16A and 16B.
Figure 17B:
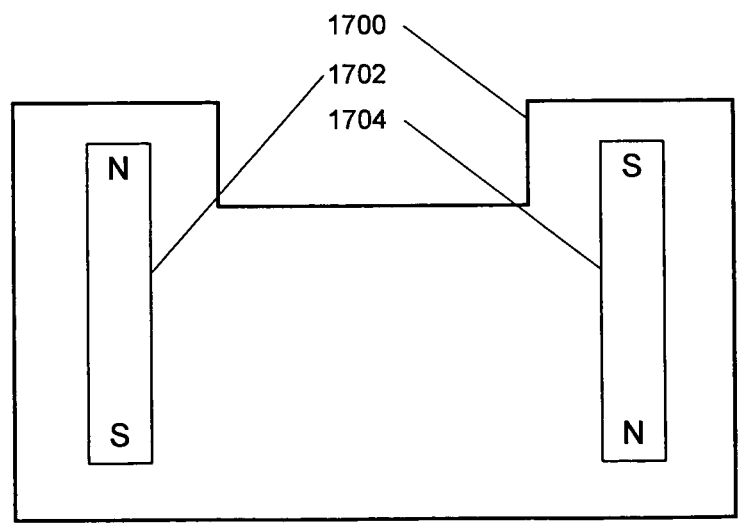

FIGS. 17A and 17B are schematic illustrations of different arrangements of permanent magnets within the device of FIGS. 16A and 16B.

In FIG. 17A the device 1700 is shown with an illustration of the arrangement of the two permanent magnets 1702, 1704 within the device.

This arrangement is in some respects the most straightforward to manufacture, because the two mass and spring systems 1602, 1604 of FIG. 16, and the corresponding magnets 1702, 1704 are essentially identical.

However, the stray magnetic flux of the device is relatively pervasive, which can cause difficulties in some applications of the vibration absorber (on aircraft, for example).

In FIG. 17B, one of the magnets has had its polarity reversed. Whilst not an obvious manufacturing choice, the reversal of the polarity of the magnets can have an appreciable effect on constraining the stray magnetic flux. As a result, the device 1700 can be used closer to sensitive instruments such as compasses, and the vibration absorber can be placed around the structure with greater flexibility.

The various embodiments described above relate to active tuned vibration absorbers. It will be appreciated that the system may also be used for other applications such as a tuned "shaker" that converts a demand signal into mechanical perturbations of the structure. Some principles may also be applied to isolation mounts.

The control processes described in relation to the various embodiments given above have been described largely with reference to the time domain. It will be appreciated that the same principles can be applied as appropriate in the frequency domain.

It will also be appreciated that the principles applying to linear displacements, velocities and accelerations can be adapted as appropriate to apply to rotational displacements, velocities and accelerations, or any combination thereof.

Some examples have been given for the target mechanical impedance function T but other forms are of course possible. It has been mentioned that the function T may be varied in response to changes of detected vibrational frequencies. The function T may also be varied in other circumstances, and may be varied as the result of one or more further feedback control systems. The function T may in particular be varied in an application such as on an aircraft in dependence on the location of the vibration absorber and/or aircraft, the pressure, altitude, cabin differential pressure, temperature, thrust, airspeed, engine frequency, and so on. Other factors are of course possible.

Further modifications lying within the spirit and scope of the present invention will be apparent to a skilled person in the art.

The invention claimed is:

1. An active tuned vibration absorber for reducing vibrations in a structure, the vibration absorber comprising:
   a mount for attachment to the structure;
   a moveable mass;
   a spring arrangement connected between the mass and the mount;
   an actuator arrangement for applying a force between the mass and the mount;
   a first sensor for providing a first measurement indicative of a force exerted between the structure and the mount;
   a second sensor for providing a second measurement indicative of an acceleration of the structure at or proximate to the mount; and
   a control system for generating an actuator driving signal for driving the actuator using the first and second measurement,
   wherein only one of a spring arrangement and actuator arrangement is directly connected between the mass and the mount via the first sensor, and
   wherein the control system is operable to generate the actuator driving signal to cause the first measurement and second measurement to conform to a target relationship such that the active tuned vibration absorber dissipates energy transferred from the structure, and
   wherein, in isolation from the actuator arrangement and control system, the moveable mass and the spring arrangement form a first resonant system having a first Q factor and, when controlled by and combined with the actuator arrangement and control system, the moveable mass and the spring arrangement form a second resonant system with a second Q factor, and wherein the second Q factor is larger than the first Q factor.

2. A vibration absorber according to claim 1, wherein the control system is operable to generate the actuator driving signal to cause a frequency domain representation of the first measurement and a frequency domain representation of the second measurement to converge to a target ratio.

3. A vibration absorber according to claim 1, wherein the control system is operable to generate an actuator drive signal to cause the mechanical impedance of the vibration absorber to converge to a target mechanical impedance substantially equivalent to the mechanical impedance of a passive tuned device.

4. A vibration absorber according to claim 1, wherein the control system includes a feedforward control system.

5. A vibration absorber according to claim 4, wherein the feedforward control system is operable to process signals using a reference model that is defined in terms of characteristics of the vibration absorber, whereby the reference model does not need to take into account characteristics of the structure.

6. A vibration absorber according to claim 1, wherein the control system includes a feedback control system.

7. A vibration absorber according to claim 1, wherein the first sensor is a force sensor attached to or proximate the mount.

8. A vibration absorber according to claim 1, wherein the first sensor is an accelerometer attached to the moveable mass.

9. A vibration absorber according to claim 1, wherein the second sensor is an accelerometer attached to or proximate the mount.

10. A vibration absorber according to claim 1, further comprising a communications unit for communicating with a remote controller.

11. A vibration absorber according to claim 10, wherein the vibration absorber is operable to receive a command signal from the remote controller, and to alter the target relationship in dependence on the command signal.

12. A vibration absorber according to claim 10, wherein the vibration absorber is operable to receive a command signal from the remote controller, and to drive the actuator using the command signal.

13. A vibration absorber according to claim 10, wherein the vibration absorber is operable to determine a communications failure between the vibration absorber and the remote controller, and to adapt to a local control mode in response to the communications failure.

14. A vibration absorber according to claim 10, wherein the vibration absorber is operable to transmit at least one of the first and second measurements to the remote controller.

15. A vibration absorber according to claim 1, operable to receive a signal indicative of a characteristic frequency of vibration in the structure, and to alter the target relationship in dependence on the received signal.

16. A vibration absorber according to claim 1, operable to determine a characteristic frequency of vibration in the structure, and to alter the target relationship in dependence on the determined frequency.

17. A vibration absorber according to claim 16, wherein the vibration absorber is operable to process the first or second measurements to determine the frequency of a harmonic of a frequency of vibration, and to alter the target relationship in dependence on the determined harmonic frequency in order to counteract the vibration.

18. A vibration absorber according to claim 1, for use with a vibration source that generates vibrations having a frequency varying over time within a set of characteristic frequencies, wherein the control system further comprises:
a plurality of control subsystems taking the first and second measurements as an input, each control subsystem being tuned to a respective one of the set of characteristic frequencies; and
a processing unit for combining the output of the subsystems to generate the actuator driving signal.

19. A vibration absorber according to claim 18, wherein each control subsystem includes an adaptive filter for generating the output of the subsystem, and the control system is operable to control the adaptation of each of the adaptive filters in dependence on the degree of excitation or response of each of the subsystems.

20. A system for attenuating vibrations in a structure, comprising a plurality of active tuned vibration absorbers as defined in claim 1.

21. A system according to claim 20, further comprising a central controller, operable to receive at least one signal representative of a vibration in the structure, and to transmit a command signal to at least one of the plurality of vibration absorbers to control the or each vibration absorber to reduce the vibration.

22. A vibration absorber according to claim 1, wherein the control system is operable to estimate a total of the force exerted between the structure and the mount using the first signal and the second signal and/or a signal indicative of a force generated by the actuator.

23. A vibration absorber according to claim 22, wherein the force indicated by the first measurement is not equal to the total of the forced exerted.

24. An active tuned vibration absorber for reducing vibrations in a structure, the vibration absorber comprising:
a mount for attachment to the structure;
a moveable mass;
a spring arrangement connected between the mass and the mount;
an actuator arrangement for applying a force between the mass and the mount;
a force sensor attached to or proximate the mount for outputting a measurement indicative of a force exerted between the structure and the mount; and
a control system for generating a drive signal for the actuator arrangement using the measurement, the actuator drive signal being generated to cause the mechanical impedance of the vibration absorber to converge to a target mechanical impedance substantially equivalent to the mechanical impedance of a passive tuned device such that the active tuned vibration absorber dissipates energy transferred from the structure,
wherein only one of the spring arrangement and actuator arrangement is directly connected between the mass and the mount via the first sensor, and
wherein, in isolation from the actuator arrangement and control system, the moveable mass and the spring arrangement form a first resonant system having a first Q factor and, when controlled by and combined with the actuator arrangement and control system, the moveable mass and the spring arrangement form a second resonant system with a second Q factor, and wherein the second Q factor is larger than the first Q factor.

25. A method of reducing vibrations in a structure, comprising:
   providing a mount for attachment to the structure;
   providing a moveable mass;
   providing a spring arrangement connected between the mass and the mount;
   providing an actuator arrangement for applying a force between the mass and the mount;
   providing a first sensor for providing a first measurement indicative of a force exerted between the structure and the mount;
   providing a second sensor for providing a second measurement indicative of an acceleration of the structure at or proximate to the mount; and
   providing a control system for generating an actuator driving signal for driving the actuator using the first and second measurement,
   wherein only one of the spring arrangement and actuator arrangement is directly connected between the mass and the mount via the first sensor, and
   wherein the control system is operable to generate the actuator driving signal to cause the first measurement and second measurement to conform to a target relationship such that the active tuned vibration absorber dissipates energy transferred from the structure, and
   wherein, in isolation from the actuator arrangement and control system, the moveable mass and the spring arrangement form a first resonant system having a first Q factor and, when controlled by and combined with the actuator arrangement and control system, the moveable mass and the spring arrangement form a second resonant system with a second Q factor, and wherein the second factor is larger than the first Q factor.

* * * * *